US012520126B2

(12) United States Patent
Jung et al.

(10) Patent No.: US 12,520,126 B2
(45) Date of Patent: Jan. 6, 2026

(54) ELECTRONIC DEVICE AND METHOD FOR TRANSFERRING SUBSCRIPTION BY USING EMBEDDED SIM IN THE ELECTRONIC DEVICE

(71) Applicant: Samsung Electronics Co., Ltd., Suwon-si (KR)

(72) Inventors: Jieun Jung, Suwon-si (KR); Jaehyeon Seo, Suwon-si (KR); Jimin Park, Suwon-si (KR); Hyongjin Ban, Suwon-si (KR); Yejin Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 17/856,405

(22) Filed: Jul. 1, 2022

(65) Prior Publication Data

US 2023/0030914 A1    Feb. 2, 2023

Related U.S. Application Data

(63) Continuation of application No. PCT/KR2022/007415, filed on May 25, 2022.

(30) Foreign Application Priority Data

Jul. 30, 2021    (KR) .................. 10-2021-0100920

(51) Int. Cl.
*H04W 12/72* (2021.01)
*H04W 8/20* (2009.01)
*H04W 12/069* (2021.01)

(52) U.S. Cl.
CPC ......... *H04W 8/205* (2013.01); *H04W 12/069* (2021.01); *H04W 12/72* (2021.01)

(58) Field of Classification Search
CPC ..... H04W 8/20; H04W 8/205; H04W 12/069; H04W 12/72
See application file for complete search history.

(56) References Cited

U.S. PATENT DOCUMENTS 9,510,185 B2    11/2016 Xiong
2012/0190354 A1    7/2012 Merrien et al.
(Continued)

FOREIGN PATENT DOCUMENTS

CN    105637498 B    5/2019
EP    3890378 A1    10/2021
(Continued)

OTHER PUBLICATIONS

C6-200790, Introducing 5G-NG TC 15.1.2A, Authentication procedure for EAP-AKA'—Authentication is successful—GSM UICC for BlackBox Testing.
(Continued)

*Primary Examiner* — Jinsong Hu
*Assistant Examiner* — Farideh Madani
(74) *Attorney, Agent, or Firm* — Jefferson IP Law, LLP

(57) ABSTRACT

According to various embodiments, an electronic device may comprise at least one embedded universal integrated circuit card (eUICC) each storing at least one subscriber identity information and at least one processor electrically connected to the eUICC. The at least one processor may control to connect with an external electronic device through communication, receive a subscription information request for subscription transfer from the external electronic device, identify at least one transferable subscription information from profile information stored in the eUICC, in response to the reception of the subscription information request, transmit the identified at least one transferable subscription information to the external electronic device, receive to-be-
(Continued)

transferred subscription information selected from among the at least one transferable subscription information from the external electronic device, request a server to authenticate the to-be-transferred subscription selected by the external electronic device, receive information corresponding to a result of the authentication from the server, in response to the request for the authentication, and transmit information for subscription transfer including the information corresponding to the authentication result to the external electronic device.

14 Claims, 21 Drawing Sheets

(56) References Cited

U.S. PATENT DOCUMENTS

| | | | |
|---|---|---|---|
| 2014/0073292 A1* | 3/2014 | Kim | H04W 12/069 455/411 |
| 2016/0050557 A1 | 2/2016 | Park et al. | |
| 2016/0094930 A1 | 3/2016 | Ramanna et al. | |
| 2016/0373920 A1 | 12/2016 | Petersson et al. | |
| 2017/0077975 A1 | 3/2017 | Wang et al. | |
| 2018/0242137 A1 | 8/2018 | Gupta et al. | |
| 2019/0028883 A1 | 1/2019 | Namiranian | |
| 2019/0149990 A1 | 5/2019 | Wang et al. | |
| 2019/0215691 A1* | 7/2019 | Salkintzis | H04W 12/069 |
| 2019/0222999 A1 | 7/2019 | Cho et al. | |
| 2019/0268765 A1* | 8/2019 | Park | H04W 12/10 |
| 2020/0092711 A1* | 3/2020 | Chen | H04W 8/205 |
| 2020/0137557 A1* | 4/2020 | Touati | H04W 88/04 |
| 2020/0137566 A1* | 4/2020 | Jin | H04W 12/43 |
| 2020/0169870 A1* | 5/2020 | Lucas | H04W 8/265 |
| 2020/0280435 A1 | 9/2020 | Lehtovirta et al. | |
| 2020/0344603 A1 | 10/2020 | Gamishev | |
| 2021/0006964 A1 | 1/2021 | Lee et al. | |
| 2021/0076195 A1* | 3/2021 | Chaugule | H04W 8/205 |
| 2021/0105609 A1 | 4/2021 | Park et al. | |

FOREIGN PATENT DOCUMENTS

| | | |
|---|---|---|
| JP | 2014-506033 A | 3/2014 |
| KR | 10-2014-0054965 A | 5/2014 |
| KR | 10-2016-0020816 A | 2/2016 |
| KR | 10-2018-0070742 A | 6/2018 |
| KR | 10-2019-0020140 A | 2/2019 |
| KR | 10-2019-0086325 A | 7/2019 |
| KR | 10-2020-0081470 A | 7/2020 |
| KR | 10-2020-0101257 A | 8/2020 |
| KR | 10-2021-0004809 A | 1/2021 |

OTHER PUBLICATIONS

International Search Report dated Aug. 24, 2022, issued in International Patent Application No. PCT/KR2022/007415.
Extended European Search report dated Aug. 26, 2024, issued in European Application No. 22849691.5-1215.

* cited by examiner

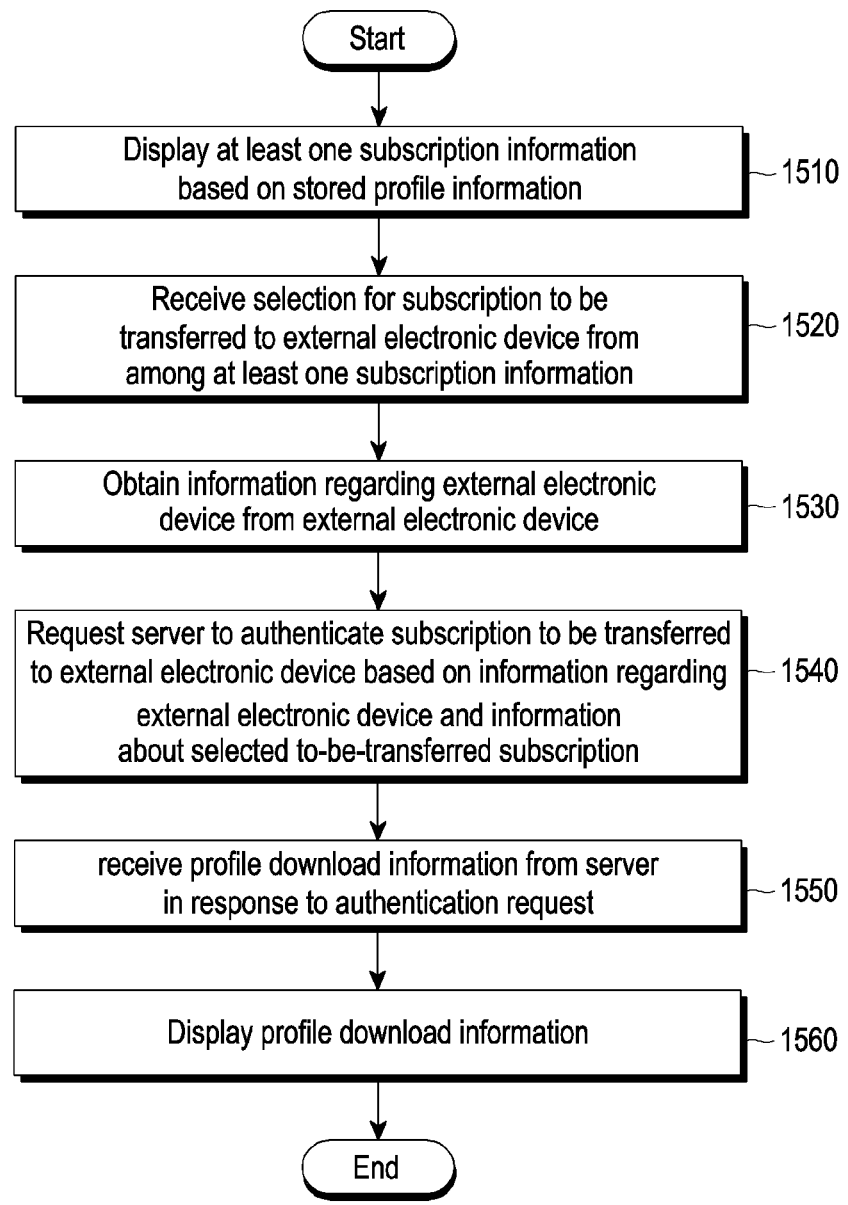

under the UICC. UICC may be called subscriber identity module (SIM) in the case of global system for mobile communications (GSM) and universal subscriber identity module (USIM) in the case of wideband code division multiple access (WCDMA), long term evolution (LTE), and new radio (NR).
ELECTRONIC DEVICE AND METHOD FOR TRANSFERRING SUBSCRIPTION BY USING EMBEDDED SIM IN THE ELECTRONIC DEVICE

CROSS-REFERENCE TO RELATED APPLICATION(S)

This application is a continuation application, claiming priority under § 365(c), of an International application No. PCT/KR2022/007415, filed on May 25, 2022, which is based on and claims the benefit of a Korean patent application number 10-2021-0100920, filed on Jul. 30, 2021, in the Korean Intellectual Property Office, the disclosure of which is incorporated by reference herein in its entirety.

TECHNICAL FIELD

The disclosure relates to an electronic device and a method for transferring a subscription using an embedded subscriber identity module (eSIM) in the electronic device.

BACKGROUND ART

In a wireless communication system, an electronic device (e.g., user equipment (UE)) may access a wireless communication network and use a voice communication or data communication service in a fixed position or on the move. To provide a communication service to an electronic device, an appropriate authentication process is required. In general, a universal integrated circuit card (UICC) is inserted into the electronic device, and authentication is performed between the electronic device and the server of the mobile network operator (MNO) through a universal subscriber identity module (USIM) installed in the UICC. UICC may be called subscriber identity module (SIM) in the case of global system for mobile communications (GSM) and universal subscriber identity module (USIM) in the case of wideband code division multiple access (WCDMA), long term evolution (LTE), and new radio (NR).

If the user of the electronic device subscribes to a wireless communication service provided by the mobile network operator, the mobile network operator may provide a UICC (e.g., a SIM card or a USIM card) to the user. The user may insert the provided UICC into her electronic device. If the UICC is inserted into the electronic device, the USIM application installed in the UICC is executed, and an appropriate authentication process may be performed with the server the mobile network operator, which stores the same value, using to the international mobile subscriber identity (IMSI) value stored in the UICC and the encryption key value for authentication. After the appropriate authentication process is performed, the wireless communication service may be used.

The UICC may be manufactured as a dedicated card for a specific communication carrier at the request of the specific communication carrier when manufacturing the card and may come equipped with authentication information (e.g., USIM application and subscriber identification ID (e.g., IMSI)) for network connection of the corresponding communication carrier and an encryption key (e.g., a known K value or Ki value). The UICC may be provided to subscribers of the communication service through the corresponding communication carrier and, as necessary later, the communication carrier may use technology, such as over the air (OTA), to install, modify, and delete applications within the UICC. The user may insert the UICC into the terminal and use the network and application services of the corresponding communication carrier. When replacing the terminal, the user may insert a removable UICC from the old terminal to the new terminal, thereby using the authentication information, phone number, and personal contact information stored in the UICC on the new terminal.

Unlike UICCs, which are manufactured and distributed exclusively for a specific communication carrier, the user may purchase a specific UICC or the user may subscribe to (or purchase) a communication service after obtaining a UICC and the user may subscribe to and cancel, open a service from a specific wireless communication carrier or change to another communication carrier (e.g., line switching). Thus, there have been proposed methods for remotely installing the communication carrier's USIM application and subscriber identity ID and encryption key on the UICC, and safely and flexibly installing and managing authentication information for various communication carriers.

For example, there has been proposed so-called embedded UICC (eUICC) capable of remotely installing a profile for providing a communication service through a network without replacing the UICC even when the user changes a communication carrier. The eUICC may be manufactured as a pre-mounted UICC, fixed in the form of a chip, in the terminal during the manufacturing process of the terminal. Accordingly, the eUICC may be used for various terminals that may have a structure in which it is not easy to mount or remove the UICC, such as machine to machine (M2M) or device to device (D2D) terminals, as well as general wireless terminal, such as mobile phones. The eUICC may also be referred to as an eSIM.

The above information is presented as background information only to assist with an understanding of the disclosure. No determination has been made, and no assertion is made, as to whether any of the above might be applicable as prior art with regard to the disclosure.

DISCLOSURE

Technical Problem

A user may transfer a subscription from an existing electronic device to a new electronic device while maintaining the authentication information, mobile communication number, and personal phone book stored in the physical UICC (e.g., SIM card) by inserting the UICC to the new electronic device.

According to various embodiments, when transferring subscription to a new electronic device including an eUICC, if the new electronic device lacks a component for insertion of a physical UICC (e.g., a slot for UICC), subscription transfer by inserting the physical UICC of the existing electronic device to the new electronic device may be difficult.

For subscription transfer between electronic devices without passing through a physical SIM card, various authentication methods may be used, such as OPEN ID or short message service (SMS)-one time password (OTP) methods. The OPEN ID or SMS-OTP methods may be inconvenient due to the need for additional user entry for authentication.

Aspects of the disclosure are to address at least the above-mentioned problems and/or disadvantages and to provide at least the advantages described below. Accordingly, an aspect of the disclosure is to provide an electronic device and a method for transferring subscription using an embedded SIM in the electronic device, which may transfer subscription without moving a physical UICC from an existing electronic device to a new electronic device.

Another aspect of the disclosure is to provide an electronic device and a method for transferring subscription using an embedded SIM in the electronic device, which may transfer subscription without additional user entry by transmitting a result of authentication of an existing electronic device to a new electronic device by connecting electronic devices via communication when transferring subscription from the existing electronic device to the new electronic device.

Another aspect of the disclosure is to provide an electronic device and a method for transferring subscription using an embedded SIM in the electronic device, which may provide relatively high-security authentication when transferring subscription by performing authentication in an extensible authentication protocol for authentication and key agreement (EAP-AKA) scheme when transferring subscription from an existing electronic device to a new electronic device.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes at least one embedded universal integrated circuit card (eUICC) each storing at least one subscriber identity information and at least one processor electrically connected to the eUICC. The at least one processor may control to connect with an external electronic device through communication, receive a subscription information request for subscription transfer from the external electronic device, identify at least one transferable subscription information from profile information stored in the eUICC, in response to the reception of the subscription information request, transmit the identified, at least one transferable subscription information to the external electronic device, receive to-be-transferred subscription information selected from among the at least one transferable subscription information from the external electronic device, request a server to authenticate the to-be-transferred subscription selected by the external electronic device, receive information corresponding to a result of the authentication from the server, in response to the request for the authentication, and transmit information for subscription transfer including the information corresponding to the authentication result to the external electronic device.

In accordance with another aspect of the disclosure, a method for performing subscription transfer in an electronic device is provided. The method includes at least one embedded universal integrated circuit card (eUICC) each storing at least one subscriber identity information and at least one processor electrically connected to the eUICC may comprise connecting with an external electronic device through communication, receiving a subscription information request for subscription transfer from the external electronic device, identifying at least one transferable subscription information from profile information stored in the eUICC, in response to the reception of the subscription information request, transmitting the identified, at least one transferable subscription information to the external electronic device, receiving to-be-transferred subscription information selected from among the at least one transferable subscription information from the external electronic device, requesting a server to authenticate the to-be-transferred subscription selected by the external electronic device, receiving information corresponding to a result of the authentication from the server, in response to the request for the authentication, and transmitting information for subscription transfer including the information corresponding to the authentication result to the external electronic device.

In accordance with another aspect of the disclosure, an electronic device is provided. The electronic device includes a display, at least one embedded universal integrated circuit card (eUICC) each storing at least one subscriber identity information, and at least one processor electrically connected to the eUICC. The at least one processor may control to display at least one subscription information on the display based on profile information stored in the eUICC, receive a selection for a subscription to be transferred to an external electronic device among the at least one subscription information, request a server to authenticate the selected subscription to be transferred to the external electronic device, receive information corresponding to a result of the authentication from the server, in response to the request for the authentication, and display information for subscription transfer on the display based on the information corresponding to the authentication result.

Advantageous Effects

According to various embodiments, it is possible to transfer subscription without moving a physical UICC from an existing electronic device to a new electronic device.

According to various embodiments, it is possible to transfer subscription without additional user entry by transmitting a result of authentication of an existing electronic device to a new electronic device by connecting electronic devices via communication when transferring subscription from the existing electronic device to the new electronic device.

According to various embodiments, it is possible to provide relatively high-security authentication when transferring subscription by performing authentication in an extensible authentication protocol for authentication and key agreement or extensible authentication protocol for 3rd part authentication and key agreement (EAP-AKA) scheme when transferring subscription from an existing electronic device to a new electronic device.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

FIG. 15 is a flowchart illustrating a subscription transfer method by an electronic device according to an embodiment of the disclosure.

MODE FOR INVENTION

Figure 1A:
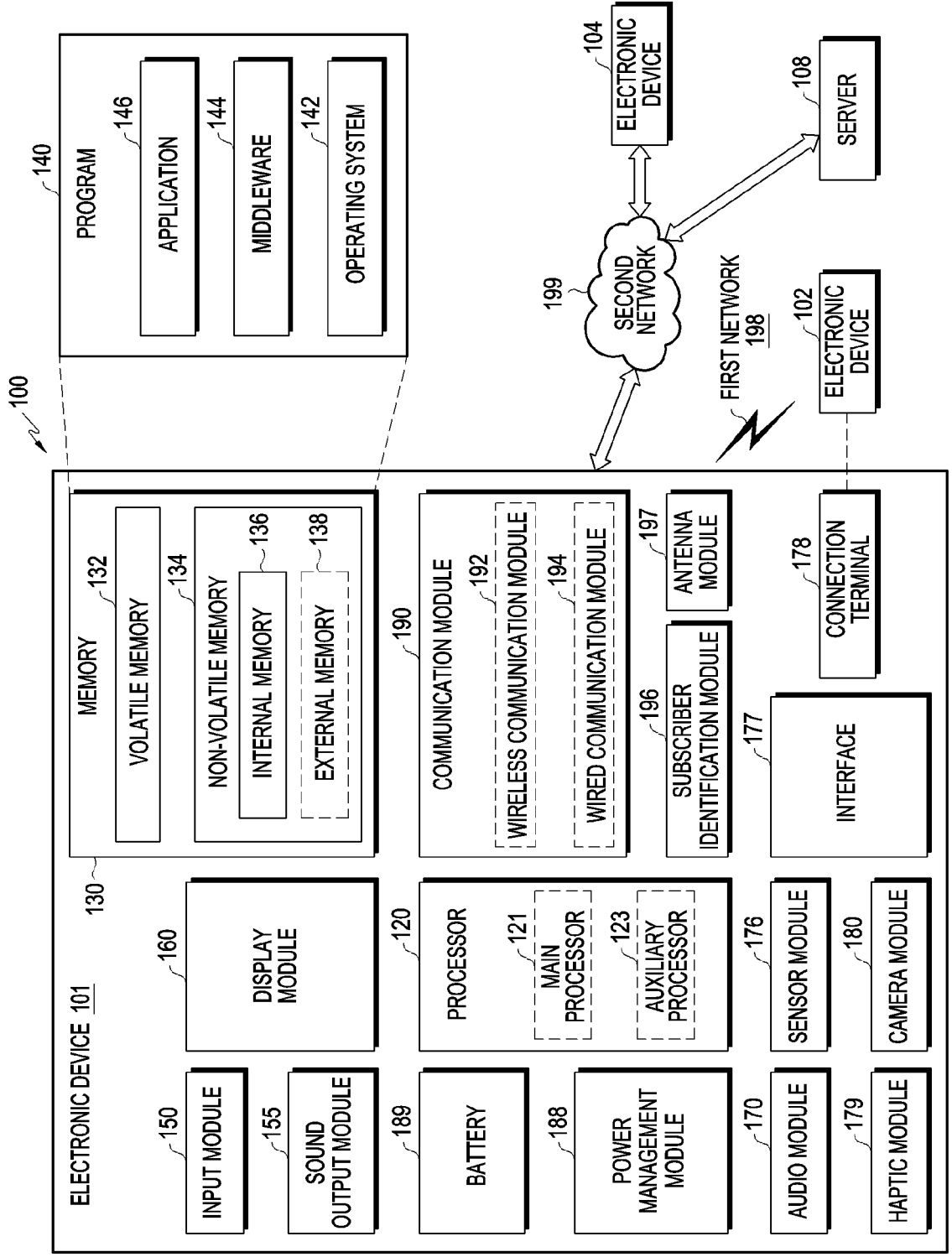
FIG. 1A is a block diagram illustrating an electronic device in a network environment according to an embodiment of the disclosure.

FIG. 1A is a block diagram illustrating an electronic device 101 in a network environment 100 according to various embodiments.

Referring to FIG. 1A, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 1B:
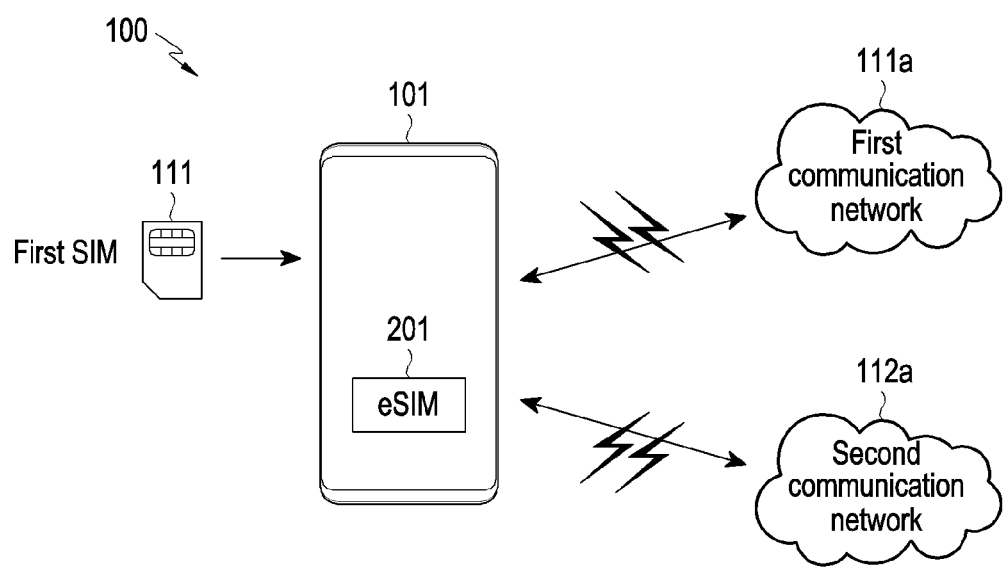
FIG. 1B is a view illustrating a network environment including an electronic device according to an embodiment of the disclosure.

FIG. 1B is a view illustrating a network environment including an electronic device according to an embodiment of the disclosure.

Referring to FIG. 1B, according to various embodiments of the disclosure, a network may include an electronic device 101, a first communication network 111a, and/or a second communication network 112a.

According to various embodiments, the electronic device 101 may operate as a dual SIM dual standby (DSDS) mode or dual SIM dual active (DSDA) mode electronic device supporting two SIMs in one device. For example, the electronic device 101 may include a first SIM 111 and an eSIM 201. The first SIM 111 may be an rSIM. For example, the electronic device 101 may be equipped with a SIM card. Hereinafter, for convenience of description, the SIM card will be referred to as a SIM. The electronic device 101 may include a slot (not shown) to receive the first SIM 111. According to an embodiment, although not shown, the electronic device 101 may receive two or more SIMs. In this case, the electronic device 101 may include a plurality of slots for receiving a plurality of SIMs.

According to various embodiments, the first SIM 111 is a SIM which has subscription to the mobile network operator of the first communication network 111a. The electronic device 101 may access the first communication network 111a using the first SIM 111 to receive the wireless communication service. According to various embodiments, the electronic device 101 may include an embedded subscriber identity module (eSIM) 201. The eSIM may be referred to as an eUICC. The electronic device 101 may receive a wireless communication service by accessing the second communication network 112a through the eSIM 201. The first communication network 111a and the second communication network 112a may be provided by the same communication carrier or may be provided by different communication carriers, separately.

According to an embodiment, although not shown, the electronic device 101 may lack a first SIM 111 and/or a slot for receiving the first SIM 111. For example, the electronic device 101 may include only an eSIM 201. According to various embodiments of the disclosure, it will be appreciated by one of ordinary skill in the art that the configuration of the electronic device 101 is not limited as long as it is an electronic device including an eSIM 201.

Figure 2:
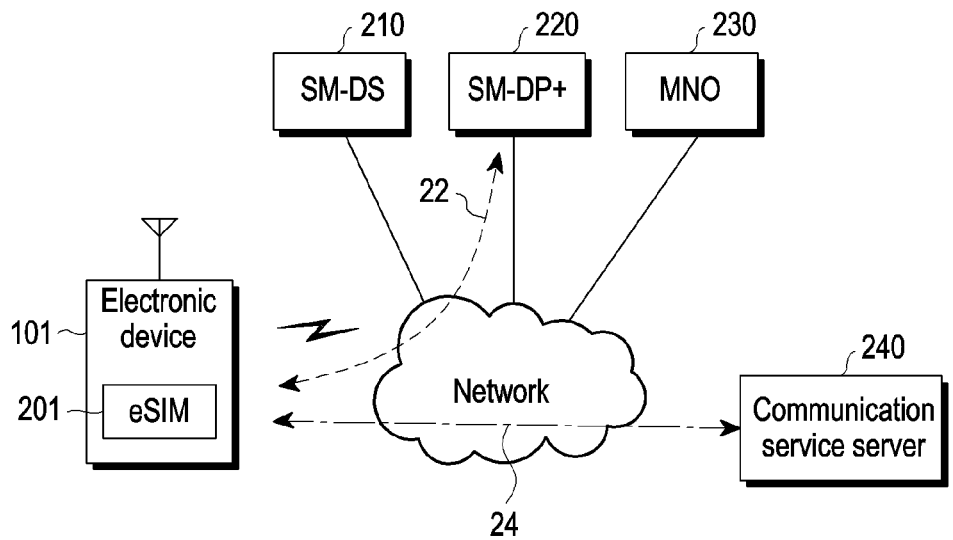
FIG. 2 is a view illustrating a system for providing a profile-based communication connection to an electronic device according to an embodiment of the disclosure.

FIG. 2 is a view illustrating a system for providing a profile-based communication connection to an electronic device according to an embodiment of the disclosure.

Referring to FIG. 2, according to various embodiments, a system 200 may include an electronic device 101, an SM-DS server 210, an SM-DP+ server 220, an MNO server 230, and a communication service server 240.

According to various embodiments, the electronic device 101 (e.g., the electronic device 101 of FIG. 1B) may include an eSIM 201. For convenience of description, although not illustrated, the electronic device 101 may include at least one slot for receiving at least one rSIM. According to various embodiments, the electronic device 101 may include or receive N (N is a natural number) SIMs (eSIMs or rSIMs)

and may perform switching to use some of them. There is no limitation to combining N SIMs, and there is also no limitation to the number.

According to various embodiments, the eSIM 201 may be inserted into the electronic device 101, provided integrally with the electronic device 101, or implemented to be accessible by the electronic device 101. According to various embodiments, the eSIM 201 may allow the electronic device 101 to perform authentication with a server of a communication carrier (mobile network operator (MNO)) using information in the eSIM 201 (e.g., a profile including universal subscriber identity module (USIM) information). According to an embodiment, the eSIM 201 may be called a subscriber identity module (SIM) card for global system for mobile communications (GSM) or called a universal subscriber identity module (USIM) card for wideband code division multiple access (WCDMA), long-term evolution (LTE), and NR, and may also be called in other various terms depending on communication schemes. For example, if the user of the electronic device 101 subscribes to a wireless communication service provided by a communication carrier, the electronic device 101 may use information in the eSIM 201, e.g., international mobile subscriber identity (IMSI) value and encryption key K for authentication, to perform an appropriate authentication process with the server of the communication carrier, which stores the same value, and then use the wireless communication service. For example, the appropriate authentication process may be authentication and key agreement (AKA) authentication (e.g., extensible authentication protocol for authentication and key agreement (EAP-AKA)). Other authentication schemes may also be used.

According to various embodiments, the eSIM 201 may be manufactured as a dedicated card for a specific communication carrier at the request of the specific communication carrier when manufacturing the card and may come equipped with authentication information (e.g., USIM application and subscriber identification ID (e.g., IMSI)) for network connection of the corresponding communication carrier and an encryption key (e.g., a known K value or Ki value). An application (or information) in the eSIM 201 may be installed, modified, deleted, or updated using a technology, such as over the air (OTA) when necessary.

According to various embodiments, the eSIM 201 may download and/or store information for providing a communication service, in the form of a profile. According to an embodiment, the profile may be installed or stored in the manufacturing process of the eSIM 201 or may be downloaded by the terminal in an over the air (OTA) scheme and installed or stored in the eSIM 201. For example, the profile may include a provisioning profile and an operational profile. It will be appreciated by one of ordinary skill in the art that even when the provisioning profile is not installed, the electronic device 101 may download the operational profile through a Wi-Fi short-range connection or an Internet connection, and the provisioning profile does not necessarily need to be installed on the electronic device 101. For example, the operational profile may be a profile including subscriber identity information about the user of the electronic device, and the provisioning profile may include information (hereinafter, "first information") for downloading subscriber identity information or a profile (hereinafter, a "first operational profile") including subscriber identity information (hereinafter, "first subscriber identity information") in the electronic device. The electronic device may download the first operational profile based on the first information on the provisioning profile in the eSIM 201.

According to various embodiments, the electronic device 101 may receive a communication service using subscriber identity information (hereinafter, 'second subscriber identity information') of an operational profile (hereinafter, a 'second operational profile') installed or stored in the eSIM 201. For example, the profile including subscriber identity information may be a subscriber identity module (SIM) profile.

According to an embodiment, the operational profile may include, in addition to the subscriber identity information, the subscriber's network access authentication information, the subscriber's phone book, the subscriber's personal information (e.g., SMS), the subscribed communication carrier name, available services, available data amount, fee or service provision speed, or information to allow for safe use of wireless communication by performing subscriber authentication and traffic security key generation upon accessing a wireless communication network, such as GSM, WCDMA, LTE, or NR.

According to various embodiments, the first information for downloading data (e.g., the first operational profile) including the first subscriber identity information may include communication session information for a designated first communication connection for downloading the first operational profile. For example, the communication session information may include subscription manager discovery service (SM-DS) server 210 access information for downloading the first operational profile or information about the communication carrier network available for SM-DS server 210 access.

According to various embodiments, the SM-DS server 210 may provide the electronic device 101 with the address of the SM-DP+ server 220 for downloading the first operational profile based on the provisioning profile.

According to various embodiments, the subscription manager data preparation plus (SM-DP+) server 220 may be a profile providing server, an off-card entity of profile domain, a profile encryption server, a profile generating server, a profile provisioner, or a profile provider. The SM-DP+ server 220 may perform a first communication connection 22 with the electronic device 101 through a wireless communication network based on a first communication connection request based on the provisioning profile from the electronic device 101 and may provide the first operational profile to the electronic device 101 through the first communication connection 22. According to various embodiments, the wireless communication network may be a specific node of the wireless communication network. For example, the wireless communication network may be a base station, a subscriber information management node, or a mobility management node of the wireless communication network. According to an embodiment, the wireless communication network may include a home position register (HLR) and/or authentication center (AuC) server that is accessed by the electronic device 101 to perform a subscriber authentication function and, by access after authentication, may connect to the communication service server 240 capable of providing communication services, such as voice communication or data communication.

According to various embodiments, the mobile network operator (MNO) server 230 may be a server associated with a mobile communication network operator. According to various embodiments, the MNO server 230 may request the SM-DS+ server 220 to prepare for at least one profile (or profile package) (e.g., the first operational profile) associated with at least one subscriber identity information (e.g., the first subscriber identity information) and transfer information associated with the first operational profile to the SM-DS+ server 220. According to an embodiment, the MNO server 230 may transfer a signal for updating and managing the first operational profile to the SM-DS+ server 220. The MNO server 230 may perform second communication connection 24 between the electronic device 101 and the communication service server 240 through the second operational profile installed in the eSIM 201 of the electronic device 101.

According to various embodiments, the communication service server 240 may be a server providing communication services. According to various embodiments, the communication service may be a service associated with transmission or reception of data through a wireless communication network. According to an embodiment, the communication service may include a service associated with transmission or reception of another profile (or data) not including subscriber identity information other than downloading the operational profile (e.g., the first operational profile including the first subscriber identity information). For example, the communication service server 240 may include a service server associated with various data transmission and reception, such as a server associated with each of various applications, a push server, a search server, or a market server. The communication service by the communication service server 240 may include various services, such as data transmission/reception by application, notification reception, push reception, link reception and access, or service request.

According to various embodiments, upon requesting a service associated with transmission or reception of a profile (or data) not including subscriber identity information, the electronic device 101 may perform the second communication connection 24 with the communication service server 240 based on the second operational profile.

According to various embodiments, the SM-DS server 210, the SM-DP+ server 220, the MNO server 230, or the communication service server 240 is merely an example of implementation of servers for performing each function, may be called by other names, and the SM-DS server 210, SM-DP+ server 220, MNO server 230, or communication service server 240 each may be composed of one or a plurality of servers. Some or all of the SM-DS server 210, the SM-DP+ server 220, the MNO server 230, or the communication service server 240 may be configured as one integrated server. According to various embodiments, an electronic device (e.g., the electronic device 101 of FIG. 1A or 1B or the electronic device 101 of FIG. 2) may comprise a display (e.g., the display module 160 of FIG. 1A), a communication module (e.g., the communication module 190 of FIG. 1A), an embedded subscription identity module (e.g., the subscription identity module 196 of FIG. 1A or the eSIM 201 of FIG. 2) storing first information associated with a first communication connection for downloading data including first subscriber identity information for accessing at least one communication service providing server, a memory (e.g., the memory 130 of FIG. 1A or the memory 211 of FIG. 2), and a processor (e.g., the processor 120 of FIG. 1A) electrically connected with the display, the communication module, and the memory. The processor may be configured to perform the first communication connection for downloading the data including the first subscriber identity information based on the first information using the communication module, terminating the first communication connection upon request for transmission or reception of data not including the first subscriber identity information during the first communication connection, and perform transmission or reception of the data by performing a second communication connection based on second subscriber identity information.

According to various embodiments, the first information may include a provisioning profile, and the data including the first subscriber identity information may include a first operational profile.

According to various embodiments, the processor may be configured to display that there is no second operational profile corresponding to the second subscriber identity information, through the display, when the subscription identity module does not include the second subscriber identity information upon request for transmission or reception of the data during the first communication connection.

According to various embodiments, the processor may be further configured to display a purchase screen associated with the second operational profile when the second operational profile does not exist.

According to various embodiments, the processor may be configured to perform a second communication session based on a second operational profile used before.

According to various embodiments, the processor may be configured to perform a second communication session based on a second operational profile selected by the user.

According to various embodiments, the processor may be configured to display at least one indicator indicating the first communication connection based on the provisioning profile through the display.

According to various embodiments, the at least one indicator may include at least one type of a service provider name (SPN), a radio access technology (RAT), and a reception signal strength indicator (RSSI).

According to various embodiments, the processor may be configured to select the provisioning profile associated with a network being in connection through the communication module.

According to various embodiments, the processor may be configured to select the provisioning profile associated with the network being in connection based on at least one of a PLMN identifier, an MCC, and area information about a network being in connection through the communication module.

Figure 3:
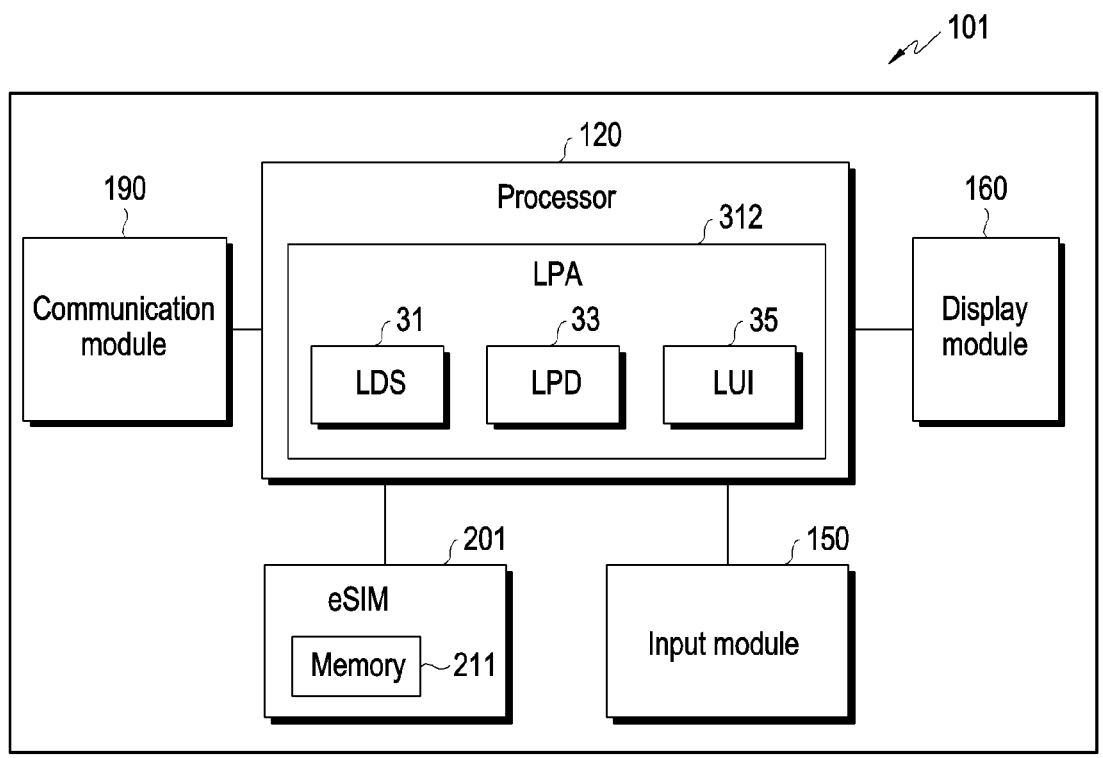
FIG. 3 is a block diagram illustrating a configuration of an electronic device according to an embodiment of the disclosure.

FIG. 3 is a block diagram illustrating a configuration of an electronic device according to an embodiment of the disclosure.

Referring to FIG. 3, according to various embodiments, the electronic device 101 of FIG. 1A or 1B or the electronic device 101 of FIG. 2 may include a processor 120, an eSIM 201, a communication module 190, and a display module 160, and an input module 150. For convenience of description, although not illustrated, the electronic device 101 may include two or more slots capable of receiving two or more rSIMs.

According to various embodiments, the processor 120 (e.g., the processor 120 of FIG. 1A) may include one or more processors (e.g., the main processor 121 and the auxiliary processor 123 or the application processor and the communication processor of FIG. 1A) and, according to an embodiment, may include a local profile assistant (LPA) 312 (e.g., LPAd (device)). According to various embodiments, when the processor 120 includes a plurality of processors, a portion of the LPA 312 may be included in some of the plurality of processors, and another portion of the LPA 312 may be included in others thereof. According to various embodiments, the LPA 312 may be included in the eSIM 201 and, in this case, the LPA 312 may be referred to as an LPAe (eUICC).

According to various embodiments, the LPA 312 may perform communication with a server to support profile download, installation, and management operations of the eSIM 201 or may perform the operation of providing a user interface required in the profile download, installation, and management operations. The LPA 312 may be a module that provides local discovery services (LDSs) 31, local profile download (LPD) 33, and local user interface (LUI) 35 operations in the electronic device 101.

According to various embodiments, the LDS 31 may perform the operation of receiving the address of the SM-DS+ server 220 capable of downloading the operational profile based on the provisioning profile from the SM-DS server 210 and communication with the SM-DS server 210.

According to various embodiments, the LPD 33 may perform the first communication connection 22 with the SM-DS+ server 220 through the wireless communication network based on the address of the SM-DS+ server 220 and perform the operation of receiving the first operational profile from the SM-DS+ server 220 through the first communication connection 22. According to various embodiments, the LPD 33 may support profile download, enable, disable, delete, or profile policy rule (PPR) download operations, started by the network, or may support profile enable, disable, delete, or eUICC reset operations by the electronic device.

According to various embodiments, the LUI 35 may perform the operation of providing various user interfaces upon downloading the operational profile. According to an embodiment, the LUI 35 may support data exchange between the LDS 31 and the LPD 33 and may include a UI for transferring the user's input to the LDS 31 or LPD 33.

According to an embodiment, the processor 120 may perform a communication service based on information stored in the eSIM 201 using (or by executing) the LPA 312. For example, the processor 120 may perform the first communication connection to download the profile (e.g., the first operational profile) including the first subscriber identity information, with the SM-DS+ server 220 through the communication module 190 based on the provisioning profile stored in the eSIM 201, using the LPA 312. Upon request of transmission or reception of the profile or data not including subscriber identity information during the first communication connection using the LPA 312, the processor 120 may terminate the first communication connection and perform the second communication connection based on the second subscriber identity information to transmit or receive a profile or data not including the subscriber identity information.

According to various embodiments, the eSIM 201 (e.g., the subscriber identification module 196 of FIG. 1A or the eSIM 201 of FIG. 2) may include one or more profiles, as information for receiving a communication service. The profile may mean at least one of an application, file system, and authentication key value stored in the eSIM 201, packaged in the form of software (e.g., packaged in the form of protected profile package (PPP) or bound profile package (BPP)). For example, the profile may include a provisioning profile and an operational profile. The operational profile may include the subscriber identity information and may further include the subscriber's network access authentication information, the subscriber's phone book, the subscriber's personal information (e.g., SMS), the subscribed communication carrier name, available services, available data amount, fee or service provision speed, or information to allow for safe use of wireless communication by performing subscriber authentication and traffic security key generation upon accessing a wireless communication network, such as GSM, WCDMA, LTE, or NR. According to an embodiment, the operational profile may include a SIM profile. For example, the SIM profile may include a SIM file system (master file (MF), dedicated file (DF), elementary files (EF)). A subscriber identity information (IMSI) value may be stored in an elementary file.

According to various embodiments, the provisioning profile may be a profile including first information for downloading the first operational profile in the electronic device. For example, the first information may include communication session information for the first communication connection designated for downloading the first operational profile. For example, the communication session information may include SM-DS server (e.g., the SM-DS server 210 of FIG. 2) access information for downloading the first operational profile and may include information about the communication carrier network available for SM-DS server access.

According to various embodiments, the communication module 190 (e.g., the communication module 190 of FIG. 1A) may perform first communication based on the provisioning profile or second communication based on the second operational profile. At least one screen associated with the first communication based on the provisioning profile or the second communication based on the second operational profile may be displayed on the display module 160.

According to an embodiment, the LPA 312 has been described as being included in the processor 120, but at least some functions of the LPA 312 may be performed by the processor 120, or a separate LPA 312 may be operated in conjunction with the processor 120. For example, the LPA 312 may be included in a program (e.g., the program 140 of FIG. 1A) and may be loaded onto the processor 120 and executed. When the LPA 312 is loaded on the processor 120 and executed, it may be understood as the operation of the processor 120. According to various embodiments, the function modules (e.g., the LDS 31, the LPD 33, or the LUI 35) included in the LPA 312 are split and may not be limited as expressed as other function modules. According to various embodiments, the LPA 312 may be included in the eSIM 201.

Figure 4:
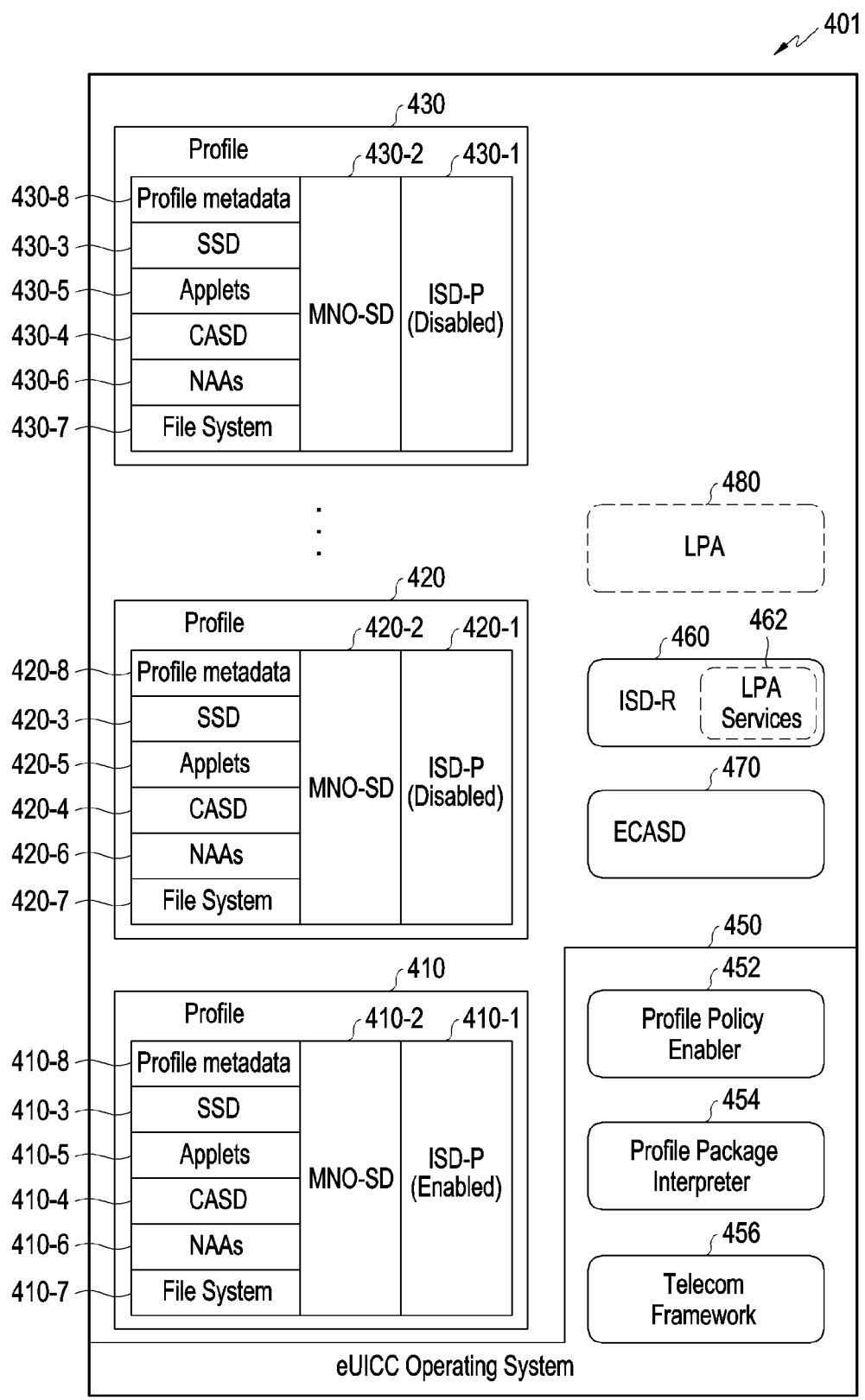
FIG. 4 is a view illustrating an internal structure of an eUICC according to an embodiment of the disclosure.

FIG. 4 is a view illustrating an internal structure of an eUICC according to an embodiment of the disclosure.

According to an embodiment, the eUICC 401 (e.g., the eSIM 201 of FIG. 2 or 3) may be in the form of a card or chip, and at least one profile 410, 420, and 430 in the form of software may be installed. According to various embodiments, each of the one or more profiles 410, 420, and 430 may be a provisioning profile or an operational profile. At least one profile 410, 420, and 430 may operate on an eUICC operating system (OS) 450. Each of the at least one profile 410, 420, and 430 may be enabled or disabled by a processor or LPA (e.g., LPA 312 of FIG. 3 or LPA 480 of FIG. 4).

Referring to FIG. 4, according to an embodiment, one profile 410 may be in an enabled state, and the remaining profiles 420 and 430 may be in a disabled state.

According to various embodiments, the eUICC operating system (OS) 450 of the eUICC 401 may include a profile policy enabler 452, a profile package interpreter 454, and a telecom framework 456. According to an embodiment, the profile policy enabler 452 may manage a policy rule (profile policy rule (PPR)) for each of the one or more profiles 410, 420, and 430. According to an embodiment, the profile package interpreter 454 may unpackage the profile (e.g., PPP or BPP) package received from the SM-DP 220, in a form that may be installed in the eUICC 401. According to an embodiment, the telecom framework 456 may perform a function associated with communication of applications in the eUICC 401. According to various embodiments, the eUICC 401 may include an issuer security domain root (ISD-R) 460 and an ECASD 470. According to an embodiment, the ISD-R 460 may manage at least one profile 410, 420, and 430 installed in the eUICC 401. For example, ISD-R 460 may include LPA services 462. The LPA services 462 may manage at least one profile 410, 420, and 430 installed in the eUICC 401 through an interface with the processor or LPA (e.g., the LPA 312 of FIG. 3 or the LPA 480 of FIG. 4). According to an embodiment, the eUICC controlling authority security domain (ECASD) 470 may perform security processing on at least one profile 410, 420, and 430 installed in the eUICC 401.

According to various embodiments, each of the at least one profile 410, 420, and 430 may include an ISD-P 410-1, 420-1 or 430-1, an MNO-SD 410-2, 420-2 or 430-2, a supplementary security domain (SSD) 410-3, 420-3 or 430-3, a controlling authority security domain (CASD) 410-4, 420-4 or 430-4, applets 410-5, 420-5 or 430-5, network access applications (NAAs) 410-6, 420-6 or 430-6, a file system 410-7, 420-7 or 430-7, or profile metadata 410-8, 420-8 or 430-8.

According to an embodiment, the ISD-P 410-1, 420-1 or 430-1 may include information for decoding and interpretation of the profile package, and in cooperation with the profile package interpreter 454, may be used to unpackage and install the profile package received from the SM-DP+ 220.

According to an embodiment, the MNO-SD 410-2, 420-2 or 430-2 may include the over the air (OTA) key of the MNO and may include information for providing a secure OTA channel capable of communicating with the MNO.

According to an embodiment, the supplementary security domain (SSD) 410-3, 420-3 or 430-3 and the controlling authority security domain (CASD) 410-4, 420-4 or 430-4 may include information for performing security processing on the profile.

According to an embodiment, the applets 410-5, 420-5, or 430-5 may include various application information associated with the user of the profile.

According to an embodiment, network access applications (NAAs) 410-6, 420-6 or 430-6 may include application information that allows the profile to access the network.

According to an embodiment, the file system 410-7, 420-7 or 430-7 may include a file system associated with each piece of information in the profile.

According to an embodiment, the profile metadata 410-8, 420-8 or 430-8 may also be referred to as a profile record and may include metadata information about the profile in text form. The metadata information may include at least one of the profile's integrated circuit card ID (ICCID), profile name, profile providing MNO's name, user's profile nickname, icon, profile class, notification configuration information, profile owner information, or profile policy rule (PPR).

According to various embodiments, the ICCID of the profile, as a profile identifier, may indicate a unique identifier of each profile. The name of the profile may include the name of each profile. The profile providing MNO's name may include the name of the communication carrier that provided the profile. The user's profile nickname may include the user-specified profile nickname. The icon may include an icon corresponding to the profile. The profile class may include information indicating whether the profile type is a provisioning profile or an operational profile. The notification configuration information may include the address of the server (e.g., the SM-DP+ server 220) to receive notifications. The profile owner information may include mobile country code (MCC), mobile network code (MNC), and group identifier (GID) 1 or 2 information associated with the profile owner. For example, the mobile country code (MCC) may be a code for identifying the country, and the mobile network code (MNC) may be a code for identifying the mobile communication carrier. Group identifier (GID) 1 or 2 may be code area information for identifying the group or area to which the profile belongs. The area information may include a group including a plurality of countries. The profile policy rule (PPR) may include policy rule information for managing the profile.

According to various embodiments, the electronic device 101 may identify whether it is a provisioning profile or an operational profile using the profile class information of the profile metadata 410-8, 420-8 or 430-8 included in each of at least one profile 410, 420 or 430 included in the eUICC 401 and enable or disable each of the provisioning profile or the operational profile through the LPA (the LPA 312 of FIG. 3 or the LPA 480 of FIG. 4).

Figure 5:
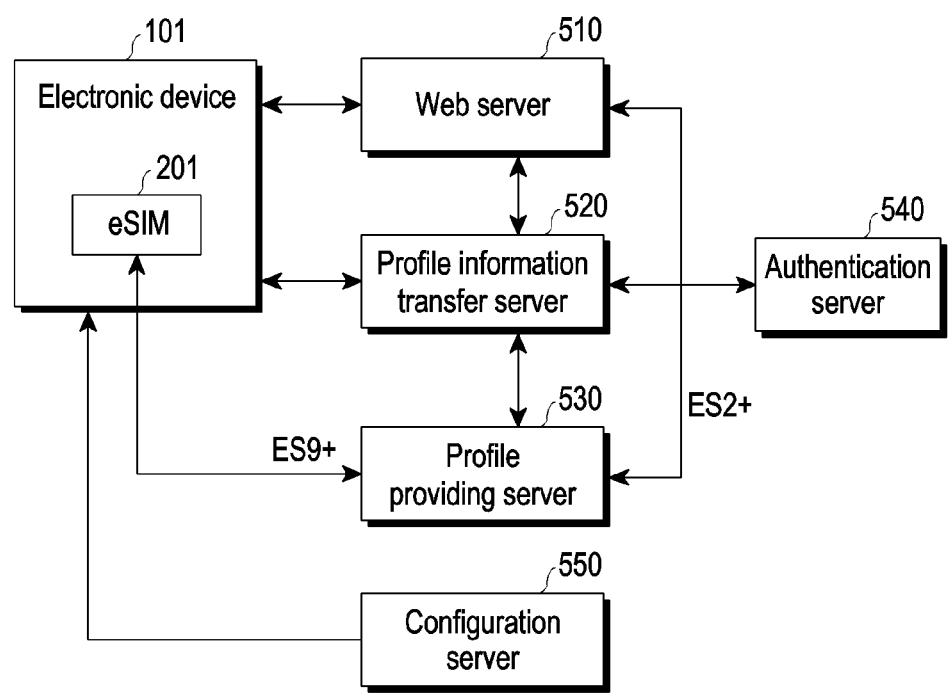
FIG. 5 is a block diagram illustrating a network system for subscription transfer according to an embodiment of the disclosure.

FIG. 5 is a block diagram illustrating a network system for subscription transfer according to an embodiment of the disclosure.

Referring to FIG. 5, according to various embodiments, a network system may include an electronic device 101, a web server 510, a profile information transfer server 520, a profile providing server 530, an authentication server 540, or a configuration server 550. At least one of the web server 510, the profile information transfer server 520, the profile providing server 530, the authentication server 540, or the configuration server 550 may be included in a communication carrier server managed by the communication carrier. According to various embodiments, the web server 510 and the profile information transfer server 520 may be servers managed by the same communication carrier or different communication carriers. According to various embodiments, the profile information transfer server 520 and the profile providing server 530 may be servers managed by the same communication carrier or different communication carriers. The eSIM 201 may be inserted or embedded in the electronic device 101. A profile may be downloaded and installed in the eSIM 201.

According to various embodiments, the electronic device 101 may access the web server 510 through the profile information transfer server 520 or may directly access the profile information transfer server 520. For example, when the electronic device 101 accesses the profile information transfer server 520, the profile information transfer server 520 may authenticate the electronic device 101 or the user of the electronic device 101 through the authentication server 540 and perform an eligibility check. If the electronic device 101 or the user of the electronic device 101 is normally authenticated and determined to be eligible, the profile information transfer server 520 may transmit information for accessing the web server 510 to the electronic device 101. The electronic device 101 may access the web server 510 using the information for accessing the web server 510 received through the profile information transfer server 520. According to various embodiments, the electronic device 101 may access the profile information transfer server 520 through the web server 510 or may directly access the profile information transfer server 520 without the web server 510. According to various embodiments, the web server 510 may provide a user interface (UI) or web page for the profile information transfer server 520. For example, the electronic device 101 may request subscription, opening, or line switching for a specific profile through a web page provided from the web server 510. According to various embodiments, the profile information transfer server 520 may provide communication line management and creation, service control, and status information. The profile information transfer server 520 may be referred to as an entitlement server but is not limited thereto. For example, the profile information transfer server 520 may be an entitlement server set forth in GSMA standard document TS. 43 or may include at least some of the functions of the entitlement server defined in the standard document. The term 'entitlement' defined in the standard document may include applicability, availability, or status of a service required before providing the service (e.g., a communication service) to the user of the electronic device 101. For example, the profile information transfer server 520 may perform a function of transferring profile-related information (e.g., profile download information (e.g., address information about the profile providing server 530) or profile download-related information) provided to the electronic device 101. In the following description, profile information may include information related to the profile, and for convenience of description, it will be referred to as profile download information or profile download-related information. The profile information transfer server 520 may include, but is not limited to, a discovery and push function (DPF), a subscription manager discovery service (SM-DS), a subscription manager secure routing (SM-SR), a subscription manager secure routing plus (SM-SR+), an off-card entity of eUICC profile manager or a profile management credentials holder (PMC holder), or an eUICC manager (EM).

According to various embodiments, the profile providing server 530 may perform a function of managing and downloading the profile. For example, the profile providing server 530 may include, but is not limited to, a subscription manager data preparation (SM-DP), a subscription manager data preparation plus (SM-DP+), an off-card entity of profile domain, a profile encryption server, a profile generation server, a profile provider (profile provisioner (PP)), a profile provider, or a profile provisioning credentials holder (PPC holder).

According to various embodiments, the configuration server 550 may provide configuration information to the electronic device 101. The configuration information provided by the configuration server 550 may include communication carrier information. The communication carrier information may include at least one of addresses of servers (e.g., the web server 510, profile information transfer server 520, and profile providing server 530), supportable on device activation (ODA) functions, supportable authentication schemes (e.g., short message service (SMS)-one time password (OTP) authentication scheme, extensible authentication protocol for authentication and key agreement (EAP-AKA) authentication scheme), and mobile country code (MCC) and mobile network code (MNC) of communication carrier.

Hereinafter, a method for transferring subscription between electronic devices is described with reference to FIGS. 6A, 6B, 7A to 7C, 8, 9A, 9B, 10A to 10C, 11, 12A, 12B, 13, 14A, 14B, and 15. In the following description, "subscription transfer" may mean transferring subscription information installed on a first electronic device (e.g., an existing electronic device) to a second electronic device (e.g., a new electronic device). For example, subscription transfer from the first electronic device to the second electronic device may lead to the same or similar results to those obtained when transferring a SIM card from the first electronic device to the second electronic device. When a subscription corresponding to a first profile installed on the first electronic device is transferred to the second electronic device, the first profile installed on the first electronic device may be processed not to be used, and a second profile corresponding to the first profile may be newly installed on the second electronic device according to the subscription transfer. The second profile may include at least portion of the same or similar information to the first profile (e.g., the same or similar subscription information). The second profile may include the same subscription conditions (e.g., billing conditions) as those of the first profile, and it may include subscription conditions similar to or different from the subscription conditions of the first profile as a subscription condition is changed during subscription transfer. Although it is described below to transfer subscription for a profile installed on an eSIM 201, it may also be applied to subscription transfer for UICC in the same or similar manner according to various embodiments.

Figure 6A:
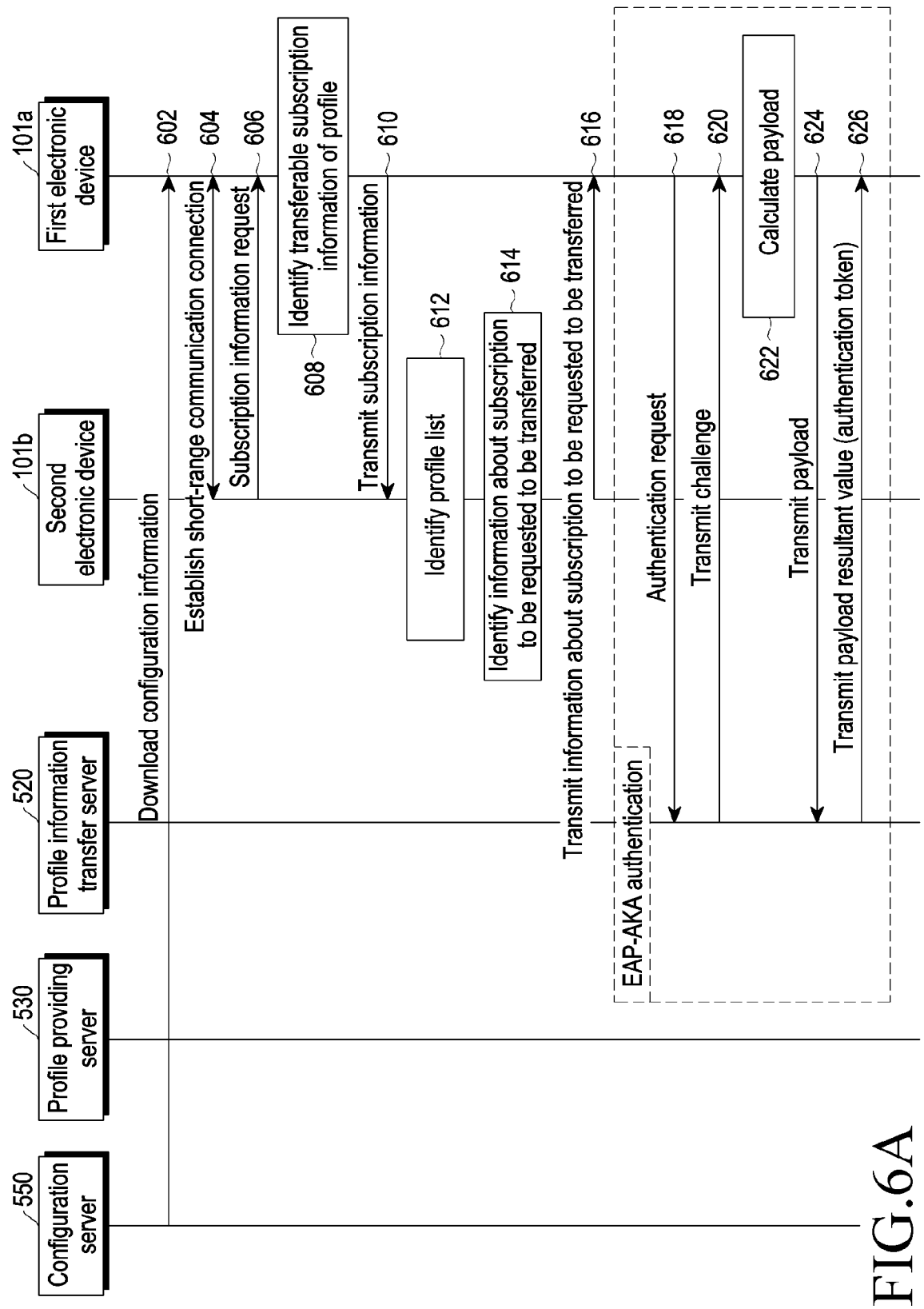
FIGS. 6A and 6B are views illustrating signal flows between devices representing a subscription transfer method according to various embodiments of the disclosure.
Figure 6B:
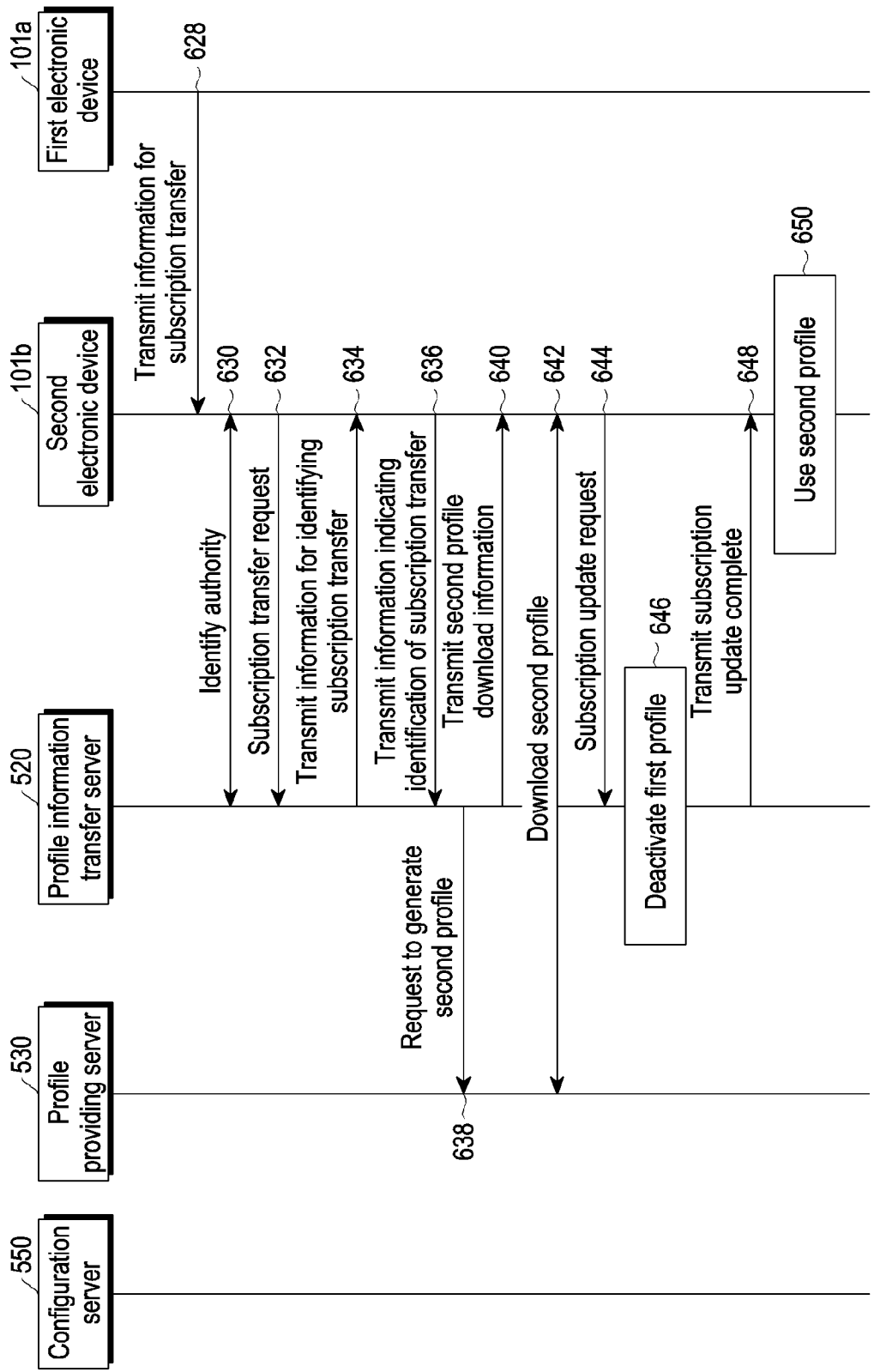

FIGS. 6A and 6B are views illustrating signal flows between devices representing a subscription transfer method according to various embodiments of the disclosure.

Referring to FIGS. 6A and 6B, as subscription transfer is performed from the first electronic device 101a to the second electronic device 101b as described below, a second profile corresponding to a first profile installed on an eSIM 201 of the first electronic device 101a may be installed on the eSIM 201 of the second electronic device 101b.

According to various embodiments, the first electronic device 101a (e.g., the processor 120 of FIG. 1A) may download configuration information from the configuration server 550 in operation 602. According to various embodiments, the configuration information downloaded from the configuration server 550 may include communication carrier information. The communication carrier information may include at least one of addresses of servers (e.g., the web server 510, profile information transfer server 520, and profile providing server 530), supportable on device activation (ODA) functions, supportable authentication schemes (e.g., short message service (SMS)-one time password (OTP) authentication scheme, extensible authentication protocol authentication and key agreement (EAP-AKA) authentication scheme), and mobile country code (MCC) and mobile network code (MNC) of communication carrier.

According to various embodiments, the first electronic device 101a may be connected to the second electronic device 101b through short-range wireless communication in operation 604. The short-range wireless communication may include at least one of infrared data association (IrDA), Bluetooth, Bluetooth low energy (BLE), Wi-Fi, Wi-Fi direct, ultra-wide band (UWB), or near field communication (NFC), but is not limited thereto. According to various embodiments, in operation 604 of FIG. 6A, the first electronic device 101a and the second electronic device 101b may be connected to each other through a wired cable (e.g., universal serial bus (USB) cable) instead of short-range wireless communication connection. In each of the embodiments described below, data transmitted/received through short-range wireless communication between the first electronic device 101a and the second electronic device 101b may also be transmitted/received through the wired cable.

Figure 7A:
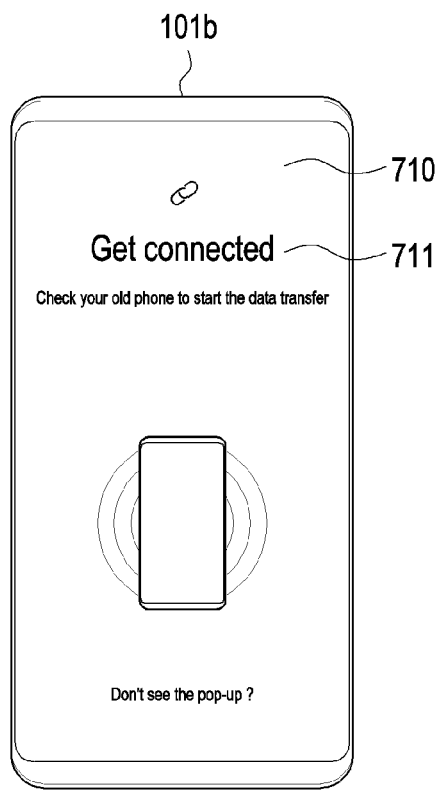
FIGS. 7A, 7B, and 7C are views illustrating a user interface displayed on a screen of a new electronic device according to various embodiments of the disclosure.
Figure 7B:
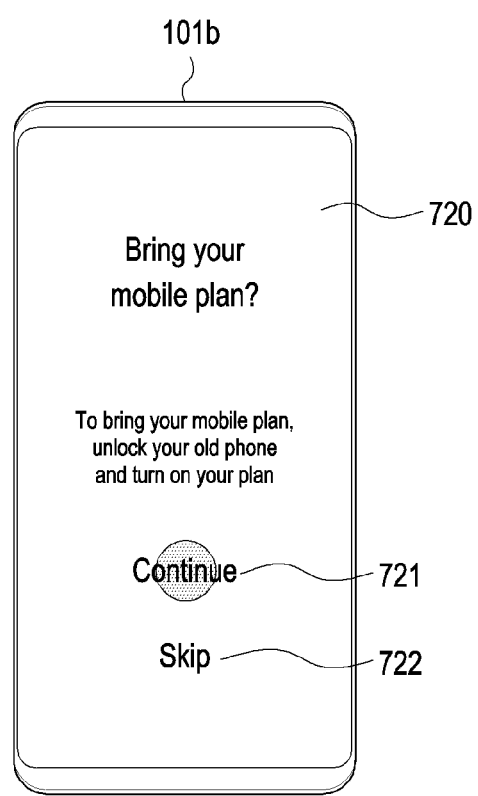
Figure 7C:
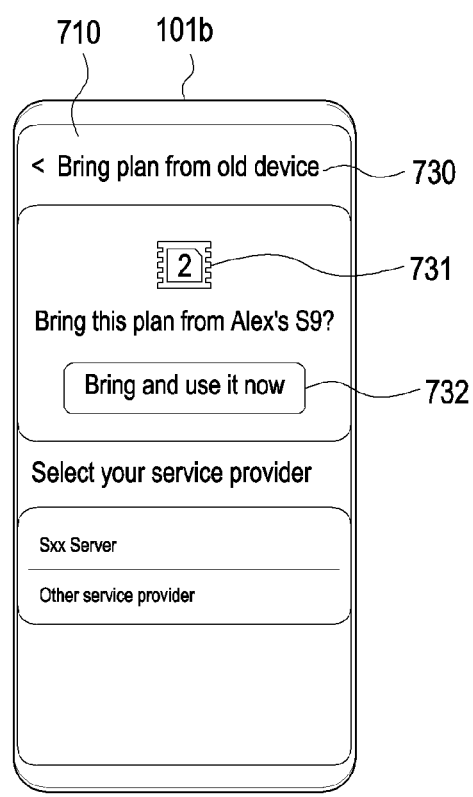

FIGS. 7A, 7B, and 7C are views illustrating a user interface displayed on a screen of a new electronic device according to various embodiments of the disclosure. According to various embodiments, as the second electronic device 101b is connected to the first electronic device 101a, as shown in FIG. 7A, information 711 indicating that it is connected with the first electronic device 101*a* may be displayed on a screen 710 of the second electronic device 101*b*.

Referring to FIG. 7A, the information 711 indicating that it is connected with the first electronic device 101*a* may include information for preparing for a task related to subscription transfer for a profile stored in the first electronic device 101*a* (e.g., "Check your old phone to start the data transfer"). According to various embodiments, after the connection state with the first electronic device 101*a* is displayed as shown in FIG. 7A, a guide message (e.g., a guide message for subscription transfer) for fetching data from the first electronic device 101 may be displayed on the screen 710 of the second electronic device 101*b* as shown in FIG. 7B.

Referring to FIG. 7B, the guide message may further include information for unlocking the first electronic device 101*a* and leading to turn on a corresponding plan (e.g., "To bring your mobile plan, unlock your old phone and turn on your plan") 720. When the user selects a button (e.g., a "continue" button) 721 for proceeding with subscription transfer on the screen shown in FIG. 7B, a subscription transfer procedure described below may proceed. On the other hand, if the user selects a button (e.g., a "skip" button) 722 for canceling subscription transfer on the screen shown in FIG. 7B, the subscription transfer procedure may be canceled.

According to various embodiments, the second electronic device 101*b* may request subscription information from the connected first electronic device 101*a* in operation 606. In response to receiving the request for subscription information from the second electronic device 101*b*, the first electronic device 101*a* may identify transferable subscription information from among profiles stored in the eSIM in operation 608. Whether subscription information about the profiles stored in the first electronic device 101*a* is transferable may be identified based on information received from the configuration server 550 in the above-described operation 602.

According to various embodiments, the first electronic device 101*a* may transmit the identified transferable subscription information to the second electronic device 101*b* in operation 610. In operation 612, the second electronic device 101*b* may identify a list of profiles corresponding to the transferable subscription information received from the first electronic device 101*a* and may display information corresponding to the corresponding profile on the screen 730 as shown in FIG. 7C. For example, referring to FIG. 7C, the second electronic device 101*b* may display a button 732 (e.g., a "Bring and use it now" button) for requesting subscription transfer for the corresponding profile, along with an image 731 corresponding to the transferable profile from the first electronic device 101*a*, on the screen 730. FIG. 7C exemplifies a case where there is one transferable profile, but when there are a plurality of transferable profiles, a list corresponding to the plurality of transferable profiles may be displayed on the screen 730. According to various embodiments, the second electronic device 101*b* may provide a menu for selecting a service provider on the screen 730.

According to various embodiments, if the user selects a button 732 for requesting subscription transfer for a specific profile on the screen 730, the second electronic device 101*b* may identify subscription information about the specific profile as subscription information in response to selection of the button 732, in operation 614.

According to various embodiments, the second electronic device 101*b* may identify the subscription information about the specific profile, selected as above, as subscription information to be requested for transmission and, in operation 616, transmit the subscription information to be requested to be transferred (e.g., information corresponding to the corresponding profile) to the first electronic device 101*a*.

According to various embodiments, the second electronic device 101*b* may transmit information about the second electronic device 101*b* to the first electronic device 101*a* through the above-described operation 604, operation 606, operation 616, or a separately added operation. For example, the information about the second electronic device 101*b* may include identification information about the second electronic device 101*b*. The identification information about the second electronic device 101*b* may include at least one of an international mobile subscriber identity (IMSI), an eUICC identity (EID), an international mobile equipment identity (IMEI), an integrated circuit card identity (ICCID), or a mobile station international ISDN number (MSISDN). According to various embodiments, when transmitting authentication token and/or information for subscription transfer to the second electronic device 101*b* in the following description, the first electronic device 101*a* may encrypt the authentication token and/or information for subscription transfer using at least part of the identification information about the second electronic device 101*b* and then transmit it to the second electronic device 101*b*. The second electronic device 101*b* may receive the encrypted authentication token and/or information for subscription transfer from the first electronic device 101*a* and decrypt the encrypted authentication token and/or information for subscription transfer using information about the second electronic device 101*b* (e.g., at least part of the identification information about the second electronic device 101*b*). It is possible to prevent theft and use of the authentication token and/or information for subscription transfer by a device other than the second electronic device 101*b* by encrypting and transmitting the authentication token and/or information for subscription transfer. The embodiment of encrypting the authentication token and/or information for subscription transfer using the identification information about the second electronic device 101*b* and then transmitting it to the second electronic device 101*b* may be applied, in the same or similar manner, to other embodiments described below, as well as those described above in connection with FIGS. 6A and 6B.

According to various embodiments, the first electronic device 101*a* may perform authentication for subscription transfer according to the request for subscription transfer for the profile selected by the second electronic device 101*b*. For example, the first electronic device 101*a* may perform authentication for subscription transfer with the authentication server 540 through the profile information transfer server 520. According to various embodiments, the authentication method for the subscription transfer may include an extensible authentication protocol for authentication and key agreement (EAP-AKA) authentication scheme. The EAP-AKA authentication scheme has relatively strong security compared to other types of authentication schemes (e.g., SMS-OTP) and does not require entry of additional information by the user, thereby providing intuitive and simple subscription transfer.

In FIG. 6A, operations 618 to 626 may operate according to the EAP-AKA authentication scheme. The EAP-AKA authentication scheme may include at least part of the EAP-AKA authentication scheme disclosed in GSMA standard document TS. 43.

According to various embodiments, the first electronic device 101a may request authentication from the profile information transfer server 520 in operation 618. For example, the first electronic device 101a may request the EAP-AKA authentication scheme-based authentication from the profile information transfer server 520. The first electronic device 101a may transmit an authentication request including the IMSI, IMEI, or a combination thereof, of the first electronic device 101a to the profile information transfer server 520.

According to various embodiments, the profile information transfer server 520 may transmit a challenge to the first electronic device 101a in response to the authentication request in operation 620. For example, the challenge may be an arbitrary number for authenticating the eSIM 201 of the first electronic device 101a. The first electronic device 101a may obtain the payload for the challenge based on information stored in the eSIM 201. According to various embodiments, in operation 622, the first electronic device 101a may calculate and obtain the payload for the challenge based on the authentication key value of the eSIM 201. In operation 624, the first electronic device 101a may transmit the payload obtained based on the eSIM 201 to the profile information transfer server 520. According to various embodiments, the profile information transfer server 520 may receive the payload from the first electronic device 101a and may perform authentication through the authentication server 540. For example, the authentication server 540 may determine whether authentication succeeds by comparing the payload with a value resultant from converting the challenge based on a key predesignated for the eSIM 201 of the first electronic device 101a. If the value resultant from converting the challenge based on the key predesignated for the eSIM 201 is identical to the payload, the authentication server 540 may determine that authentication succeeds. According to various embodiments, the first electronic device 101a may also perform the above-described EAP-AKA authentication for the eSIM 201 on the UICC included in the first electronic device 101a. For example, the first electronic device 101a may perform subscription transfer to the second electronic device 101b, for the subscription information stored in the UICC, by performing EAP-AKA authentication on the UICC. According to various embodiments, if it is determined that authentication succeeds as a result of authentication through the authentication server 540, the profile information transfer server 520 may transmit an authentication token, as a resultant value of payload, to the first electronic device 101a in operation 606.

According to various embodiments, the first electronic device 101a may transmit information about the second electronic device 101b to the profile information transfer server 520 through the above-described EAP-AKA authentication operation (e.g., operations 618 to 626) and a separately added operation. For example, the information about the second electronic device 101b may include identification information about the second electronic device 101b. The identification information about the second electronic device 101b may include at least one of an international mobile subscriber identity (IMSI), an eUICC identity (EID), an international mobile equipment identity (IMEI), an integrated circuit card identity (ICCID), or a mobile station international ISDN number (MSISDN). According to various embodiments, when receiving a request for subscription transfer from the second electronic device 101b in the following description, the profile information transfer server 520 may verify the validity for the second electronic device 101b using at least part of the identification information about the second electronic device 101b received from the first electronic device 101a.

According to various embodiments, as the EAP-AKA authentication is normally complete, the first electronic device 101a may transmit the obtained authentication token to the second electronic device 101b. For example, in operation 628, the first electronic device 101a may transmit information for subscription transfer, including the authentication token, to the second electronic device 101b through short-range wireless communication or wired cable. According to various embodiments, the information for subscription transfer may include information regarding the first electronic device 101a. For example, the information regarding the first electronic device 101a may include at least one of the mobile country code (MCC) and mobile network code (MNC), international mobile subscriber identity (IMSI), eUICC identity (EID), international mobile equipment identity (IMEI), integrated circuit card identity (ICCID), and product model name identified from the profile information stored in the eSIM 201. According to various embodiments, at least part or whole of the information for subscription transfer transmitted from the first electronic device 101a to the second electronic device 101b may be encrypted and transferred. According to various embodiments, the token information and/or the information for subscription transfer may be encrypted using at least part of the identification information about the second electronic device 101b received from the second electronic device 101b as described above. For example, when transmitting information for token information and/or information for subscription transfer to the second electronic device 101b, the first electronic device 101a may encrypt the token information and/or information for subscription transfer using at least part of the identification information about the second electronic device 101b and then transmit it to the second electronic device 101b. The second electronic device 101b may receive the encrypted token information and/or information for subscription transfer from the first electronic device 101a and decrypt the encrypted token information and/or information for subscription transfer using information about the second electronic device 101b (e.g., at least part of the identification information about the second electronic device 101b). It is possible to prevent theft and use of the token information and/or information for subscription transfer by a device other than the second electronic device 101b by encrypting and transmitting the token information and/or information for subscription transfer.

According to various embodiments, the second electronic device 101b, receiving the information for subscription transfer from the first electronic device 101a, may perform a procedure for subscription transfer with the profile information transfer server 520 based on the received information for subscription transfer. For example, in operation 630, the second electronic device 101b may identify an authority for access to the profile information transfer server 520 through the profile information transfer server 520. For example, the second electronic device 101b may transmit the authentication token to the profile information transfer server 520 to identify the authority for access to the profile information transfer server 520 (or authority to use the communication service provided from the profile information transfer server 520 after accessing the profile information transfer server 520). According to various embodiments, the second electronic device 101b may transmit information about the first electronic device 101a (e.g., the IMEI of the first electronic device 101a) to the profile information transfer server 520.

As another example, the second electronic device 101b may further transmit at least one of the protocol version or the vendor, model name, or software version of the first electronic device 101a, as well as the IMEI of the first electronic device 101a, to the profile information transfer server 520. According to various embodiments, the profile information transfer server 520 may identify whether the second electronic device 101b has the authority for access to the profile information transfer server 520 based on the information transmitted from the second electronic device 101b. For example, upon an authentication procedure with the first electronic device 101a, the profile information transfer server 520 may identify whether the second electronic device 101b has the access authority based on at least part of the information received from the first electronic device 101a and the information received from the second electronic device 101b. According to various embodiments, if the second electronic device 101b is identified to have the authority to access the profile information transfer server 520, the profile information transfer server 520 may transmit information indicating that the second electronic device 101b has the authority to access the profile information transfer server 520 to the second electronic device 101b. In contrast, if the second electronic device 101b is identified not to have the authority to access the profile information transfer server 520, the profile information transfer server 520 may transmit information indicating that it has no access authority to the second electronic device 101b or may transmit a uniform resource locator (URL) to allow the second electronic device 101b to display a webpage of the profile information transfer server 520 or a webpage of the web server 510. For example, if the second electronic device 101b is identified to have no authority to access the profile information transfer server 520, the second electronic device 101b may display detailed information related to absence of authority through the webpage according to reception of the URL or a guide message related to subscription transfer on the screen.

According to various embodiments, in operation 632, the second electronic device 101b may request subscription transfer from the profile information transfer server 520 after the authority identification is complete in operation 632. For example, in response to reception of the information indicating that the second electronic device 101b has no authority to access the profile information transfer server 520 from the profile information transfer server 520, the second electronic device 101b may transmit information for requesting subscription transfer to the profile information transfer server 520.

According to various embodiments, in operation 634, the profile information transfer server 520 may transmit the information for identifying subscription transfer to the second electronic device 101b. For example, the profile information transfer server 520 may transmit, to the second electronic device 101b, the URL of a webpage to enable display of at least one of information indicating that subscription transfer is to occur, information about the first electronic device 101a (e.g., the IMEI of the first electronic device 101a), information about the second electronic device 101b (e.g., the IMEI of the second electronic device 101b), or the mobile station international ISDN number (MSISDN) of the first electronic device 101a.

According to various embodiments, in operation 636, the second electronic device 101b may transmit information indicating identification of subscription transfer to the profile information transfer server 520. The information indicating identification of subscription transfer may include the authentication token received as a result of EAP-AKA authentication of the first electronic device 101a. For example, the second electronic device 101b may receive webpage information from the profile information transfer server 520 by transmitting the information indicating identification of subscription transfer in operation 636 using the webpage URL received from the profile information transfer server 520 in operation 634. According to various embodiments, the second electronic device 101b may receive webpage information from the profile information transfer server 520 and display at least one of the information indicating that subscription transfer is to occur, the information about the first electronic device 101a, the information about the second electronic device 101b, or the MSISDN of the first electronic device 101a through a display (e.g., the display module 160 of FIG. 1A). However, the information displayed on the screen of the second electronic device 101b through the webpage information received from the profile information transfer server 520 is not limited to the above-described examples. According to various embodiments, the second electronic device 101b may receive a user input for identifying subscription transfer (or agreeing to subscription transfer) while displaying at least one of the information indicating that subscription transfer is to occur, the information about the first electronic device 101a, the information about the second electronic device 101b, or the MSISDN of the first electronic device 101a on the screen through the webpage. According to the user input for identifying subscription transfer, the profile information transfer server 520 may identify the user input for identifying subscription transfer.

According to various embodiments, upon receiving the request for subscription transfer in operation 632 or information indicating identification of subscription transfer in operation 636, from the second electronic device 101b, the profile information transfer server 520 may request the profile providing server 530 to generate (or prepare) a second profile in operation 638.

According to various embodiments, when receiving the messages in operations 630, 632, and 636 from the second electronic device 101b, the profile information transfer server 520 may identify whether the second electronic device 101b is a valid device using at least part of the identification information about the second electronic device 101b received from the first electronic device 101a as described above. It is possible to prevent theft and use of the authentication token by a device other than the second electronic device 101b by identifying whether the second electronic device 101b is a valid device using at least part of the identification information about the second electronic device 101b by the profile information transfer server 520. The embodiment of identifying whether the second electronic device 101b is a valid device using at least part of the identification information about the second electronic device 101b by the profile information transfer server 520 may be applied, in the same or similar manner, to other embodiments (e.g., the embodiments of FIGS. 12A and 12B), described below, as well as those described above in connection with FIGS. 6A and 6B.

According to various embodiments, the profile providing server 530 may generate a second profile and transmit the generated second profile to the second electronic device 101b in response to reception of the request for generating the second profile from the profile information transfer server 520. According to various embodiments, in operation 640, the profile information transfer server 520 may transmit second profile download information to the second electronic device 101b. The second profile download information transmitted from the profile information transfer server 520 to the second electronic device 101b may include the address of the profile providing server 530. According to various embodiments, the above-described operations 634 and 636 may be omitted. For example, if the second electronic device 101b requests a subscription transfer request from the profile information transfer server 520 in operation 632, the profile information transfer server 520 may request the profile providing server 530 to generate a second profile in response to reception of the subscription transfer request from the second electronic device 101b in operation 638 and, in operation 640, transmit second profile download information to the second electronic device 101b.

According to various embodiments, the second electronic device 101b may download the second profile from the profile providing server 530 based on the second profile download information (e.g., address information about the profile providing server 530) received from the profile information transfer server 520 in operation 642. For example, the second profile may be packaged in the form of software (e.g., packaged in the form of PPP or BPP) and transmitted to the second electronic device 101b. The second electronic device 101b may store or install the second profile received from the profile providing server 530 in the eSIM 201. For example, the second electronic device 101b may download the second profile, packaged in the form of PPP or BPP, from the profile providing server 530 and install it on the eUICC (e.g., the eUICC 401 of FIG. 4). According to an embodiment, the profile package interpreter 454 described above in connection with FIG. 4 may unpackage the PPP or BPP including the second profile received from the profile providing server 530 and then install it in the eUICC 401.

According to various embodiments, when storing (or installing) the second profile in the eSIM 201, the second electronic device 101b may request a subscription update from the profile information transfer server 520 in operation 644. According to various embodiments, the profile information transfer server 520 may receive the subscription update request from the second electronic device 101b and, in operation 646, deactivate (or disable) the first profile installed on the first electronic device 101a. In operation 648, the profile information transfer server 520 may transmit a message for subscription update completion to the second electronic device 101b. According to various embodiments, the second electronic device 101b may activate the second profile installed on the eSIM 201. For example, in operation 648, the second electronic device 101b may receive a response signal (e.g., a subscription update complete message) for the subscription update from the profile information transfer server 520 and then activate the second profile of the eSIM 201. In operation 650, the second electronic device 101b may use the network (e.g., a cellular network) provided by the communication carrier related to the profile information transfer server 520 using the activated second profile. According to various embodiments, operations 644 to 648 may be omitted. For example, if the profile information transfer server 520 transmits a second profile generation request to the profile providing server 530 in operation 638, the profile providing server 530 or the profile information transfer server 520 may deactivate the first profile.

Figure 8:
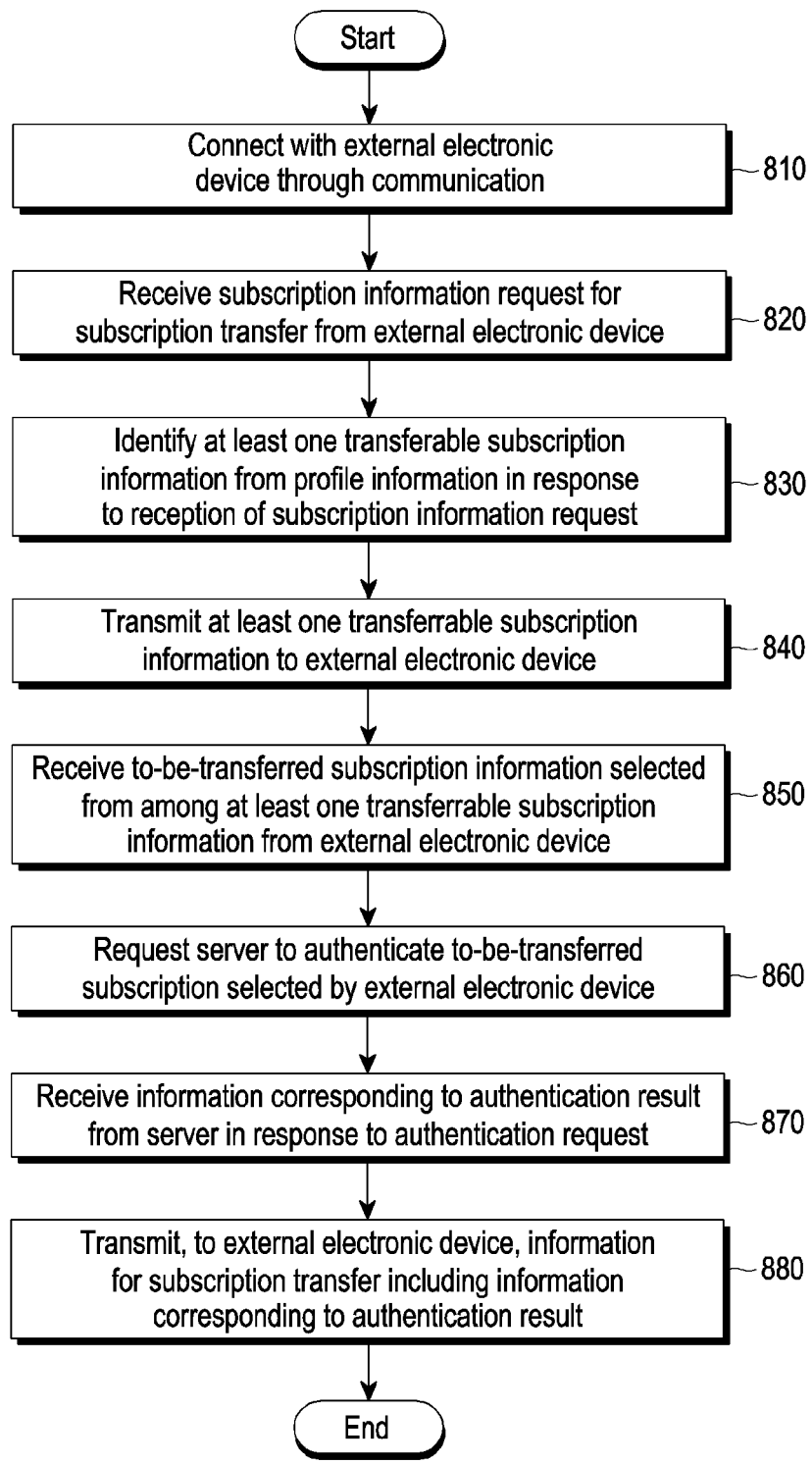
FIG. 8 is a flowchart illustrating a subscription transfer method by an electronic device according to an embodiment of the disclosure.

FIG. 8 is a flowchart illustrating a subscription transfer method by an electronic device according to an embodiment of the disclosure.

Referring to FIG. 8, according to various embodiments, the electronic device 101 (e.g., the first electronic device 101a) may connect to an external electronic device (e.g., the second electronic device 101b) through communication in operation 810. For example, the electronic device may connect to the external electronic device through short-range wireless communication.

According to various embodiments, the electronic device may receive a subscription information request for subscription transfer from the external electronic device in operation 820.

According to various embodiments, in response to reception of the subscription information request, the electronic device may identify at least one transferable subscription information from the profile information in operation 830.

According to various embodiments, the electronic device may transmit at least one transferable subscription information to the external electronic device in operation 840.

According to various embodiments, the electronic device may receive to-be-transferred subscription information selected from among the at least one transferable subscription information, from the external electronic device in operation 850.

According to various embodiments, the electronic device may request a server (e.g., the profile information transfer server 520) to authenticate the subscription to be transferred, selected by the external electronic device in operation 860. For example, the authentication request may include an authentication request by an extensible authentication protocol for authentication and key agreement (EAP-AKA) authentication scheme.

According to various embodiments, the electronic device may receive information corresponding to an authentication result from the server, in response to the authentication request in operation 870. For example, the information corresponding to the authentication result may include an authentication token.

According to various embodiments, the electronic device may transmit, to the external electronic device, information for subscription transfer including the information corresponding to the authentication result in operation 880. For example, the information for subscription transfer may include information regarding the electronic device. The information regarding the electronic device may include at least one of the mobile country code (MCC) and mobile network code (MNC), international mobile subscriber identity (IMSI), eUICC identity (EID), international mobile equipment identity (IMEI), integrated circuit card identity (ICCID), and product model name identified from the profile information.

Figure 9A:
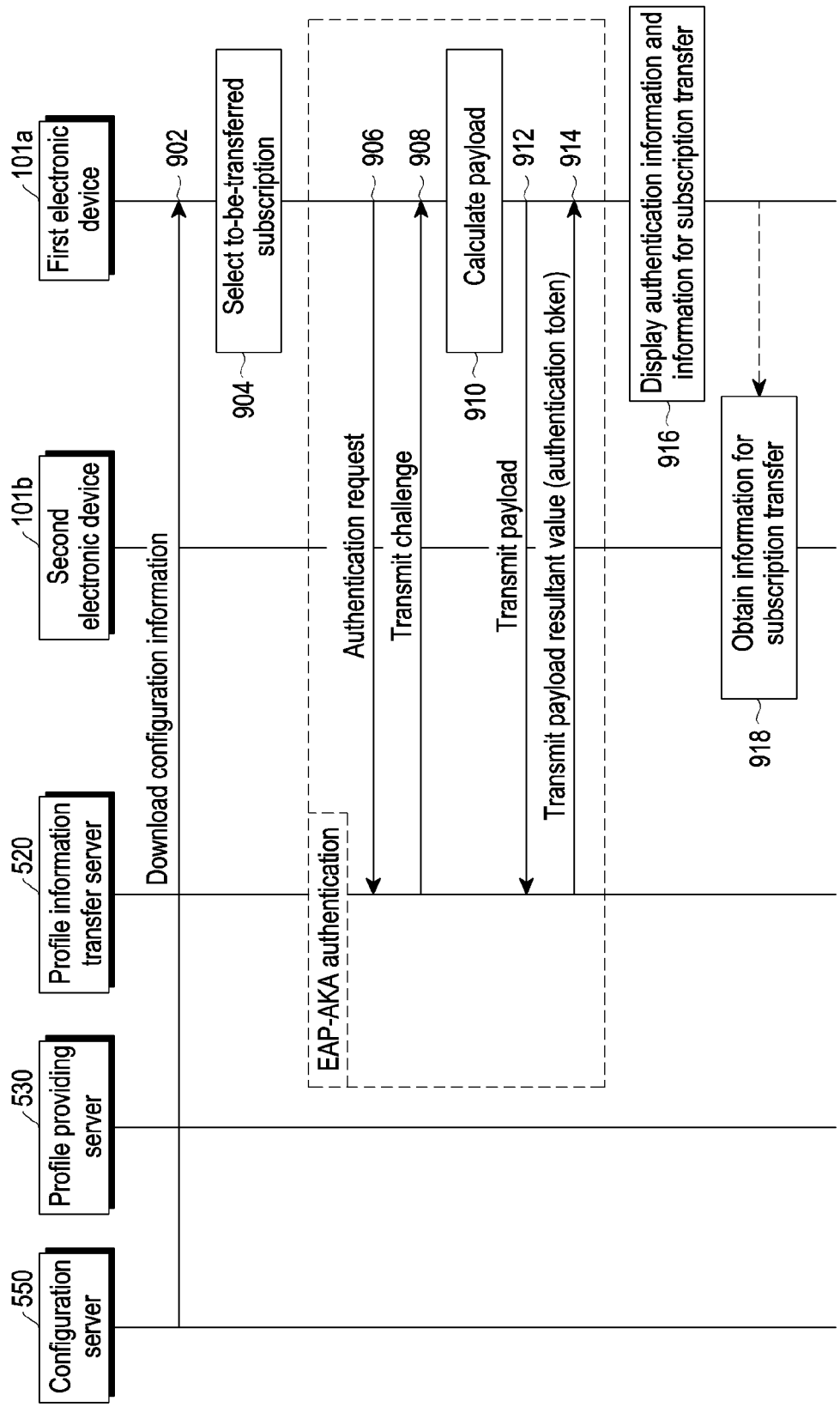
FIGS. 9A and 9B are views illustrating signal flows between devices representing a subscription transfer method according to various embodiments of the disclosure.
Figure 9B:
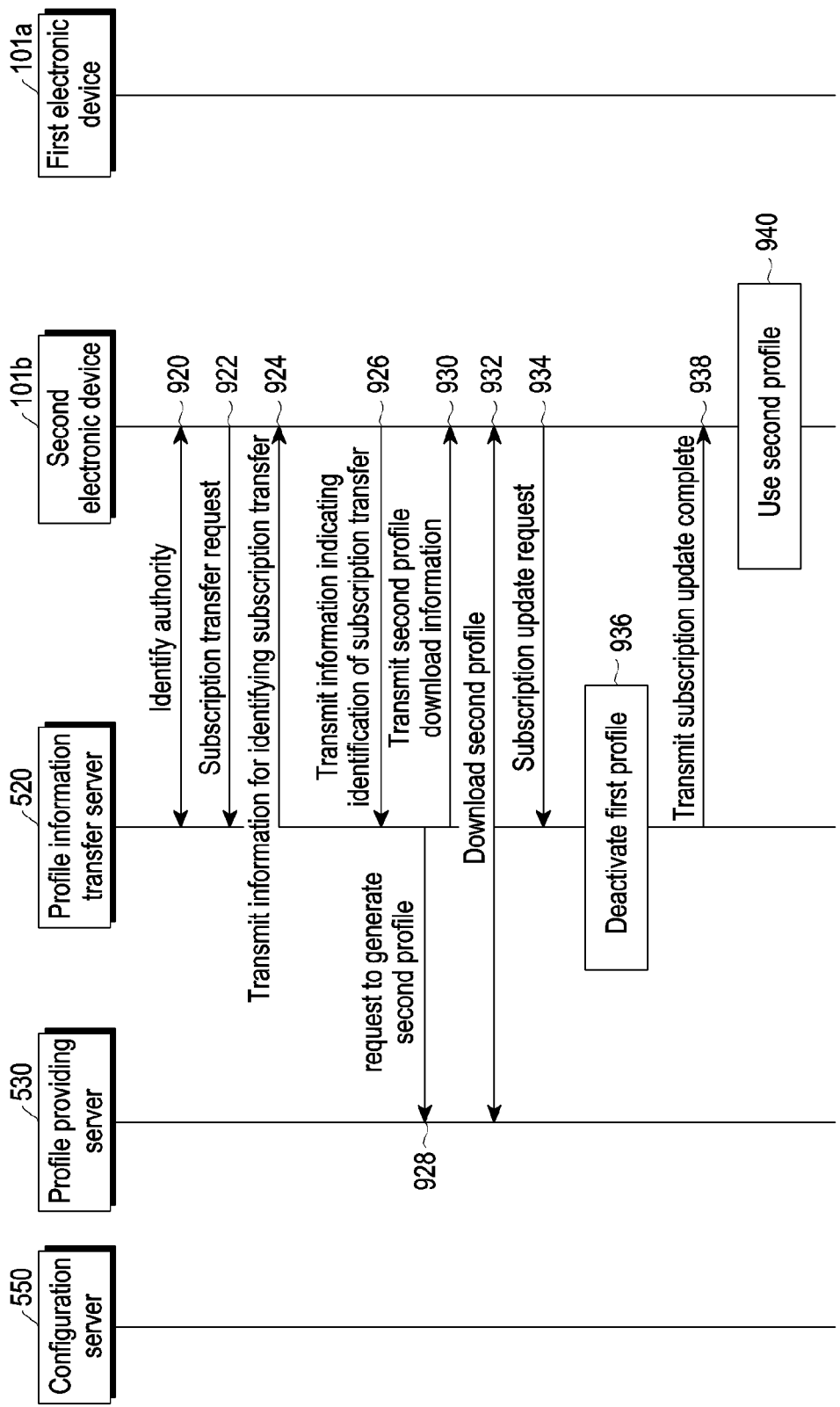

FIGS. 9A and 9B are views illustrating signal flows between devices representing a subscription transfer method according to various embodiments of the disclosure.

Referring to FIGS. 9A and 9B, as subscription transfer is performed from the first electronic device 101a to the second electronic device 101b, a second profile corresponding to a first profile installed on an eSIM 201 of the first electronic device 101a may be installed on the eSIM 201 of the second electronic device 101b.

According to various embodiments, the first electronic device 101a (e.g., the processor 120 of FIG. 1A) may download configuration information from the configuration server 550 in operation 902. According to various embodiments, the configuration information downloaded from the configuration server 550 may include communication carrier information. The communication carrier information may include at least one of addresses of servers (e.g., the web server 510, profile information transfer server 520, and profile providing server 530), supportable on device activation (ODA) functions, supportable authentication schemes (e.g., short message service (SMS)-one time password (OTP) authentication scheme, extensible authentication protocol authentication and key agreement (EAP-AKA) authentication scheme), and mobile country code (MCC) and mobile network code (MNC) of communication carrier.

According to various embodiments, the first electronic device 101a may select the subscription to be transferred to the second electronic device 101b based on the profile information stored in the eSIM 201 in operation 904. For example, as shown in FIG. 10A, if the first electronic device 101a executes a SIM card manager app, a SIM card manager screen 1010 may be displayed.

Figure 10A:
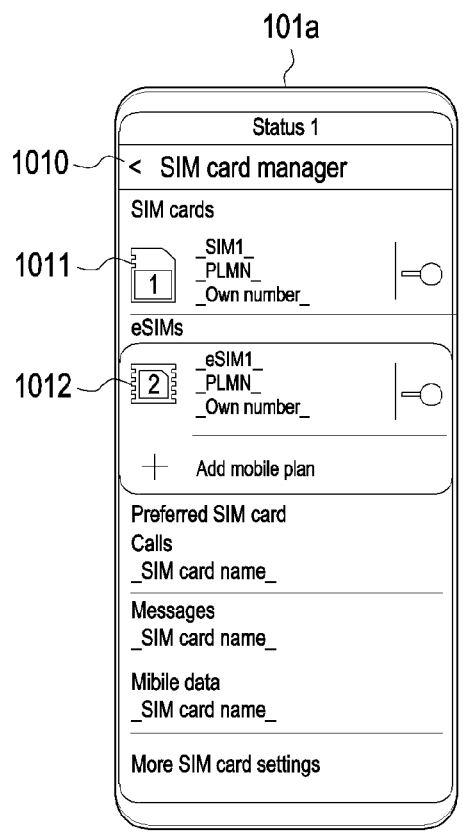
FIGS. 10A, 10B, and 10C are views illustrating a user interface displayed on a screen of a new electronic device according to various embodiments of the disclosure.
Figure 10B:
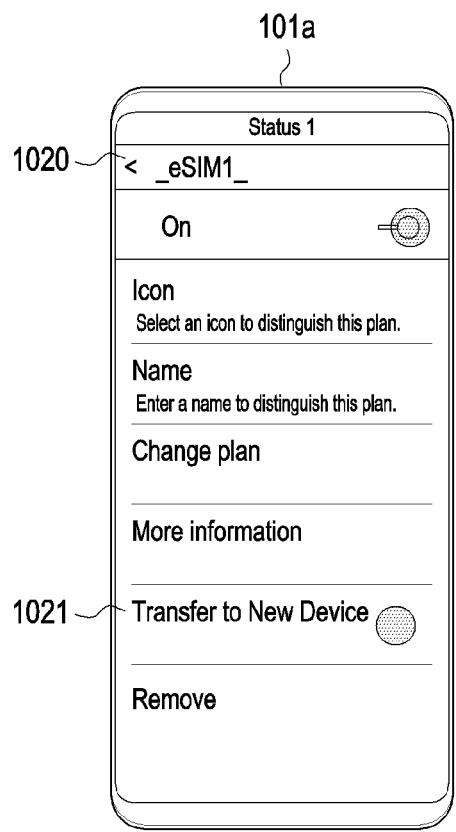
Figure 10C:
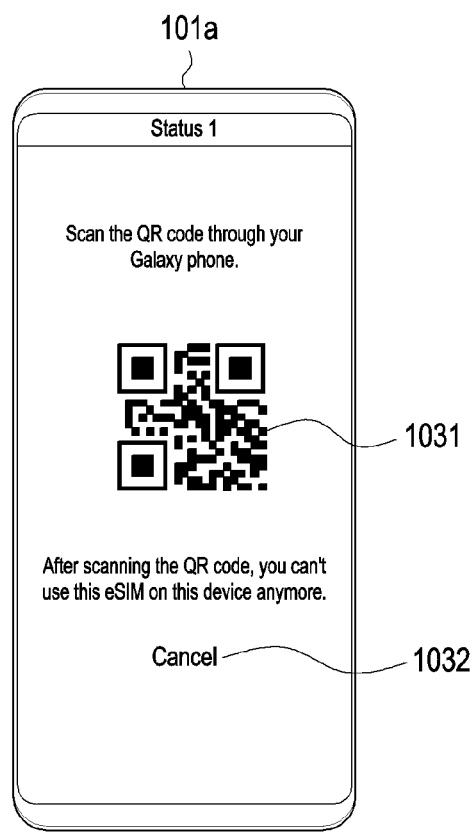

FIGS. 10A, 10B, and 10C are views illustrating a user interface displayed on a screen of the first electronic device 101a according to various embodiments of the disclosure.

Referring to FIGS. 10A, 10B and 10C, information 1011 about the physical SIM installed in the first electronic device 101a and information 1012 about the eSIM may be displayed on the SIM card manager screen 1010. If the information 1012 about the eSIM is selected in FIG. 10A, a configuration screen 1020 for the eSIM may be displayed as shown in FIG. 10B. The configuration screen 1020 for the eSIM may include a menu (Transfer to New Device) 1021 for transferring the subscription corresponding to the corresponding profile to a new electronic device (e.g., the second electronic device 101b).

According to various embodiments, if the user selects the menu 1021 for transferring the subscription corresponding to the corresponding profile to the new electronic device (e.g., the second electronic device 101b), a subscription transfer procedure corresponding to the corresponding profile may be performed as described below. For example, the first electronic device 101a may perform authentication for subscription transfer according to a subscription transfer request for the selected profile. The first electronic device 101a may perform authentication for subscription transfer with the authentication server 540 through the profile information transfer server 520. According to various embodiments, the authentication method for the subscription transfer may include an extensible authentication protocol for EAP-AKA authentication scheme. The EAP-AKA authentication scheme has relatively strong security compared to other types of authentication schemes (e.g., SMS-OTP) and does not require entry of additional information by the user, thereby providing intuitive and simple subscription transfer.

In FIG. 9A, operations 906 to 914 may operate according to the EAP-AKA authentication scheme. The EAP-AKA authentication scheme may include at least part of the EAP-AKA authentication scheme disclosed in GSMA standard document TS. 43.

According to various embodiments, the first electronic device 101a may request authentication from the profile information transfer server 520 in operation 906. For example, the first electronic device 101a may request the EAP-AKA authentication scheme-based authentication from the profile information transfer server 520. The first electronic device 101a may transmit an authentication request including the IMSI, IMEI, or a combination thereof, of the first electronic device 101a to the profile information transfer server 520.

According to various embodiments, the profile information transfer server 520 may transmit a challenge to the first electronic device 101a in response to the authentication request in operation 908. For example, the challenge may be an arbitrary number for authenticating the eSIM 201 of the first electronic device 101a. The first electronic device 101a may obtain the payload for the challenge based on information stored in the eSIM 201. According to various embodiments, in operation 910, the first electronic device 101a may calculate and obtain the payload for the challenge based on the authentication key value of the eSIM 201. In operation 912, the first electronic device 101a may transmit the payload obtained based on the eSIM 201 to the profile information transfer server 520. According to various embodiments, the profile information transfer server 520 may receive the payload from the first electronic device 101a and may perform authentication through the authentication server 540. For example, the authentication server 540 may determine whether authentication succeeds by comparing the payload with a value resultant from converting the challenge based on a key predesignated for the eSIM 201 of the first electronic device 101a. If the value resultant from converting the challenge based on the key predesignated for the eSIM 201 is identical to the payload, the authentication server 540 may determine that authentication succeeds. According to various embodiments, if it is determined that authentication succeeds as a result of authentication through the authentication server 540, the profile information transfer server 520 may transmit an authentication token, as a resultant value of payload, to the first electronic device 101a in operation 914.

According to various embodiments, as the EAP-AKA authentication is normally complete as described above, the first electronic device 101a may display information for subscription transfer, including the obtained authentication information (e.g., authentication token), on the screen in operation 916. For example, as shown in FIG. 10C, the first electronic device 101a may generate a QR code 1031 based on the information for subscription transfer and the authentication information on the screen and display the generated QR code on the screen. According to various embodiments, the information for subscription transfer may include information regarding the first electronic device 101a. For example, the information regarding the first electronic device 101a may include at least one of the mobile country code (MCC) and mobile network code (MNC), international mobile subscriber identity (IMSI), eUICC identity (EID), international mobile equipment identity (IMEI), integrated circuit card identity (ICCID), and product model name identified from the profile information stored in the eSIM 201.

According to various embodiments, the second electronic device 101b may obtain information for subscription transfer by scanning the QR code 1031 displayed on the first electronic device 101a in operation 918. In contrast, if the user selects a cancel button (e.g., a "Cancel" button) 1032 on the screen shown in FIG. 10C, the progress of the subscription transfer procedure may be canceled. According to various embodiments, if the cancel button 1032 is selected, the second electronic device 101b may delete the obtained information for subscription transfer.

According to various embodiments, the second electronic device 101b may perform the subscription transfer procedure based on the received information for subscription transfer. Hereinafter, operations 920, 922, 924, 926, 928, and 930 of FIG. 9B may be identical or similar to the above-described operations 630, 632, 634, 636, 638, and 640, respectively, of FIG. 6B, and a detailed description thereof is omitted.

According to various embodiments, the second electronic device 101b may download the second profile from the profile providing server 530 based on the second profile download information (e.g., address information about the profile providing server 530) received from the profile information transfer server 520 in operation 932. For example, the second profile may be packaged in the form of software (e.g., packaged in the form of PPP or BPP) and transmitted to the second electronic device 101*b*. The second electronic device 101*b* may store or install the second profile received from the profile providing server 530 in the eSIM 201. For example, the second electronic device 101*b* may download the second profile, packaged in the form of PPP or BPP, from the profile providing server 530 and install it on the eUICC (e.g., the eUICC 401 of FIG. 4). According to an embodiment, the profile package interpreter 454 described above in connection with FIG. 4 may unpackage the PPP or BPP including the second profile received from the profile providing server 530 and then install it in the eUICC 401.

According to various embodiments, when storing (or installing) the second profile in the eSIM 201, the second electronic device 101*b* may request a subscription update from the profile information transfer server 520 in operation 934. According to various embodiments, the profile information transfer server 520 may receive the subscription update request from the second electronic device 101*b* and, in operation 936, deactivate (or disable) the first profile installed on the first electronic device 101*a*. In operation 938, the profile information transfer server 520 may transmit a message for subscription update completion to the second electronic device 101*b*. According to various embodiments, the second electronic device 101*b* may activate the second profile installed on the eSIM 201. For example, in operation 938, the second electronic device 101*b* may receive a response signal (e.g., a subscription update complete message) for the subscription update from the profile information transfer server 520 and then activate the second profile of the eSIM 201. In operation 940, the second electronic device 101*b* may use the network (e.g., a cellular network) provided by the communication carrier related to the profile information transfer server 520 using the activated second profile. According to various embodiments, operations 934 to 938 may be omitted. For example, if the profile information transfer server 520 transmits a second profile generation request to the profile providing server 530 in operation 928, the profile providing server 530 or the profile information transfer server 520 may deactivate the first profile.

Figure 11:
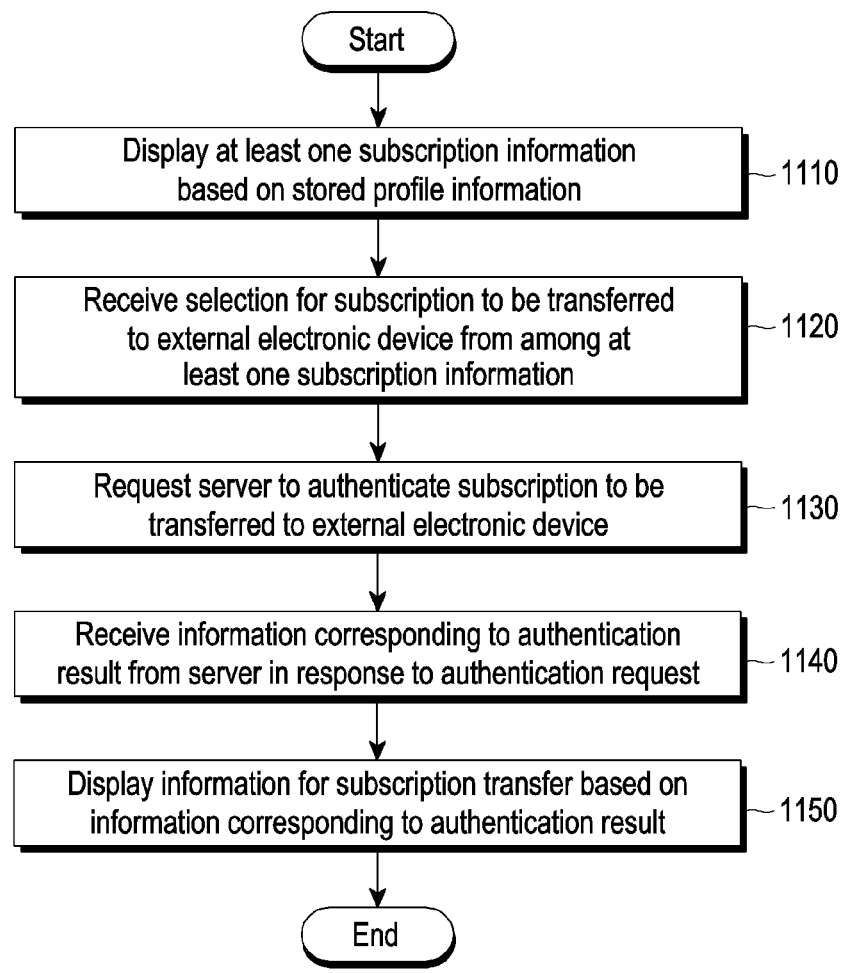
FIG. 11 is a flowchart illustrating a subscription transfer method by an electronic device according to an embodiment of the disclosure.

FIG. 11 is a flowchart illustrating a subscription transfer method by an electronic device according to an embodiment of the disclosure.

Referring to FIG. 11, according to various embodiments, an electronic device 101 (e.g., the first electronic device 101*a*) may display at least one subscription information based on stored profile information in operation 1110.

According to various embodiments, in operation 1120, the electronic device may receive a selection for the subscription to be transferred to an external electronic device (e.g., the second electronic device 101*b*) from among at least one subscription information displayed.

According to various embodiments, the electronic device may request a server (e.g., the profile information transfer server 520) to authenticate the subscription to be transferred, selected by the external electronic device in operation 1130. For example, the authentication request may include an authentication request by an extensible authentication protocol authentication and key agreement (EAP-AKA) authentication scheme.

According to various embodiments, the electronic device may receive information corresponding to an authentication result from the server, in response to the authentication request in operation 1140. For example, the information corresponding to the authentication result may include an authentication token.

According to various embodiments, in operation 1150, the electronic device may display information for subscription transfer, including information corresponding to the authentication result, on the screen in operation 1150. For example, as shown in FIG. 10C, the electronic device 101 may generate a QR code 1031 based on the information for subscription transfer and the authentication information on the screen and display the generated QR code on the screen. According to various embodiments, the information for subscription transfer may include information regarding the electronic device 101. The information regarding the electronic device may include at least one of the mobile country code (MCC) and mobile network code (MNC), international mobile subscriber identity (IMSI), eUICC identity (EID), international mobile equipment identity (IMEI), integrated circuit card identity (ICCID), and product model name identified from the profile information.

Figure 12A:
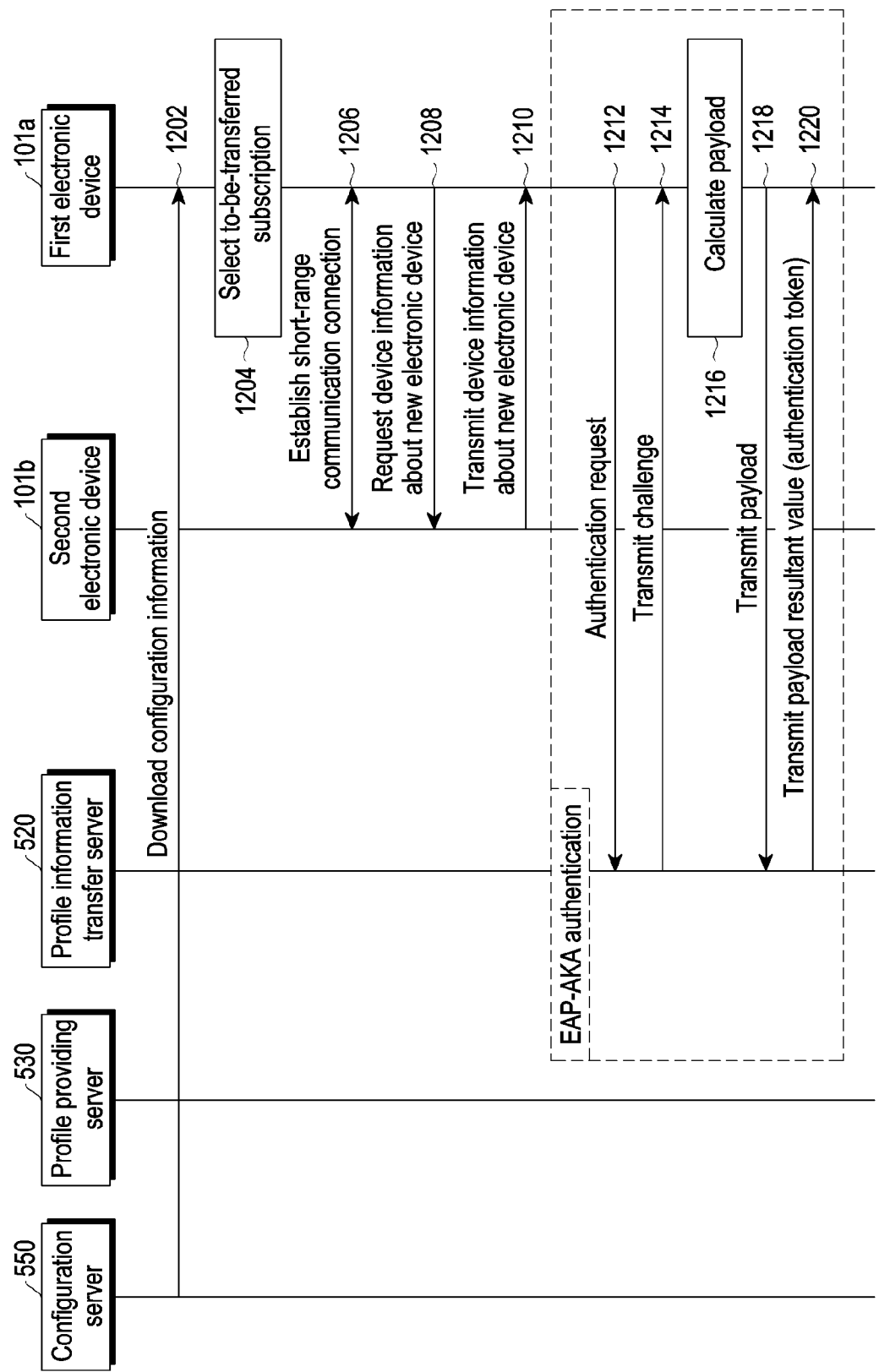
FIGS. 12A and 12B are views illustrating signal flows between devices representing a subscription transfer method according to various embodiments of the disclosure.
Figure 12B:
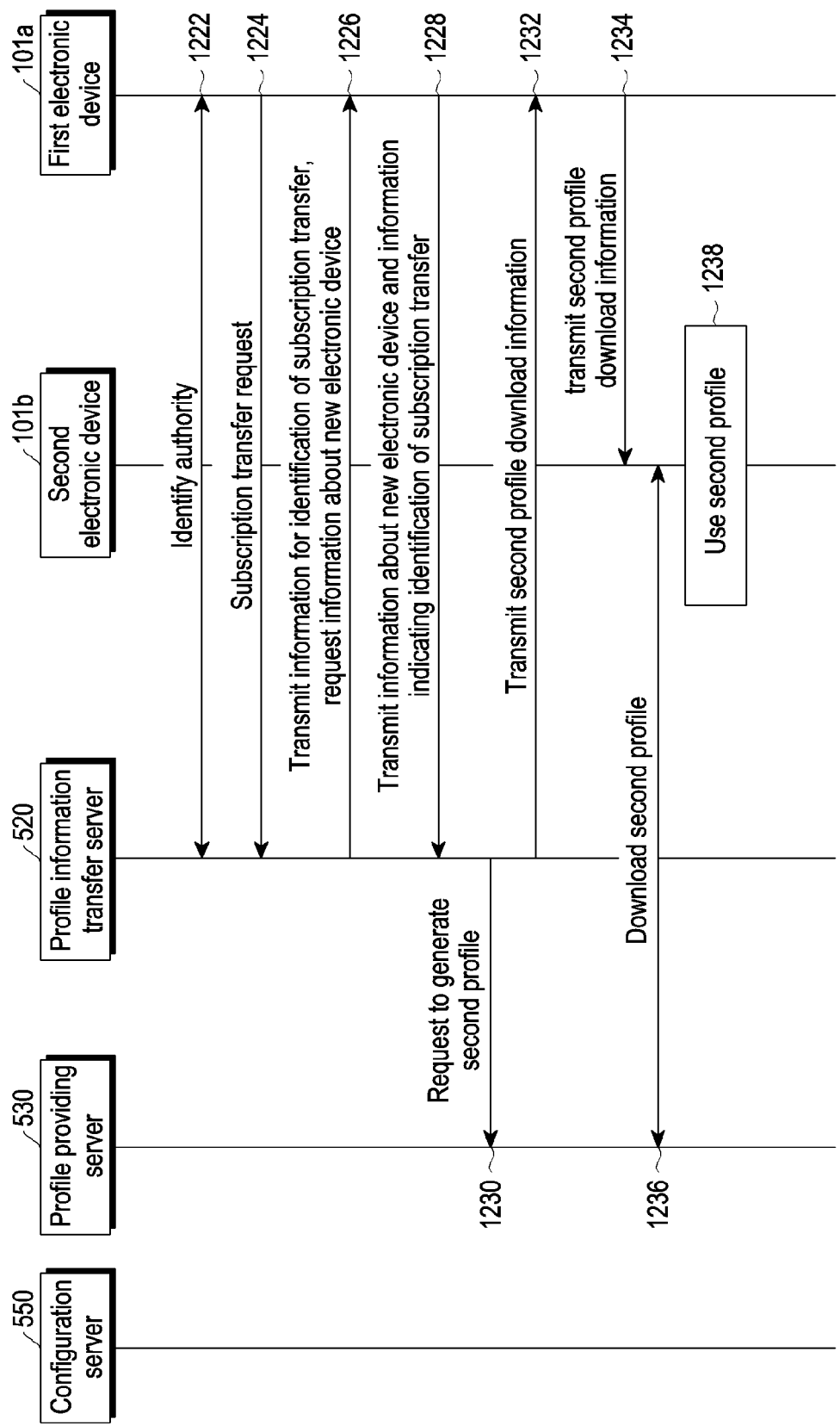

FIGS. 12A and 12B are views illustrating signal flows between devices representing a subscription transfer method according to various embodiments of the disclosure.

According to various embodiments, the first electronic device 101*a* (e.g., the processor 120 of FIG. 1A) may download configuration information from the configuration server 550 in operation 1202. According to various embodiments, the configuration information downloaded from the configuration server 550 may include communication carrier information. The communication carrier information may include at least one of addresses of servers (e.g., the web server 510, profile information transfer server 520, and profile providing server 530), supportable on device activation (ODA) functions, supportable authentication schemes (e.g., short message service (SMS)-one time password (OTP) authentication scheme, extensible authentication protocol authentication and key agreement (EAP-AKA) authentication scheme), and mobile country code (MCC) and mobile network code (MNC) of communication carrier.

According to various embodiments, the first electronic device 101*a* may select the subscription to be transferred to the second electronic device 101*b* based on the profile information stored in the eSIM 201 in operation 1204. For example, as shown in FIG. 10A, if the first electronic device 101*a* executes a SIM card manager app, a SIM card manager screen 1010 may be displayed.

Referring to FIGS. 10A, 10B, and 10C, they are views illustrating a user interface displayed on a screen of the first electronic device 101*a* according to various embodiments. Information 1011 about the physical SIM installed in the first electronic device 101*a* and information 1012 about the eSIM may be displayed on the SIM card manager screen 1010. If the information 1012 about the eSIM is selected in FIG. 10A, a configuration screen 1020 for the eSIM may be displayed as shown in FIG. 10B. The configuration screen 1020 for the eSIM may include a menu (Transfer to New Device) 1021 for transferring the subscription corresponding to the corresponding profile to a new electronic device (e.g., the second electronic device 101*b*).

According to various embodiments, if the user selects the menu 1021 for transferring the subscription corresponding to the corresponding profile to the new electronic device (e.g., the second electronic device 101*b*), a subscription transfer procedure corresponding to the corresponding profile may be performed as described below.

For example, in response to a subscription transfer request for the selected profile, the first electronic device 101*a* may establish a short-range communication connection with the second electronic device 101*b* in operation 1206. The short-range wireless communication may include infrared data association (IrDA), Bluetooth, Bluetooth low energy (BLE), Wi-Fi, Wi-Fi direct, ultra-wide band (UWB), or near field communication (NFC), but is not limited thereto. According to various embodiments, in operation 1206 of FIG. 12A, the first electronic device 101*a* and the second electronic device 101*b* may be connected to each other through a wired cable (e.g., universal serial bus (USB) cable) instead of short-range wireless communication connection. In the following description, data transmitted/received through short-range wireless communication between the first electronic device 101*a* and the second electronic device 101*b* may also be transmitted/received through the wired cable.

According to various embodiments, in operation 1208, the first electronic device 101*a* may request device information about a new electronic device (e.g., the second electronic device 101*b*) from the second electronic device 101*b* through the short-range communication. In operation 1210, the second electronic device 101*b* may transmit the device information about the second electronic device 101*b* to the first electronic device 101*a* through the short-range communication according to the request from the first electronic device 101*a*. For example, the device information about the second electronic device 101*b* may include at least one of an EID or an IMEI, but is not limited thereto.

According to various embodiments, the first electronic device 101*a* may perform authentication for subscription transfer with the authentication server 540 through the profile information transfer server 520, based on the received device information about the second electronic device 101*b*. According to various embodiments, the authentication method for the subscription transfer may include an extensible authentication protocol authentication and key agreement (EAP-AKA) authentication scheme. The EAP-AKA authentication scheme has relatively strong security compared to other types of authentication schemes (e.g., SMS-OTP) and does not require entry of additional information by the user, thereby providing intuitive and simple subscription transfer.

Referring to FIG. 12A, operations 1212 to 1220 may operate according to the EAP-AKA authentication scheme. The EAP-AKA authentication scheme may include at least part of the EAP-AKA authentication scheme disclosed in GSMA standard document TS. 43.

According to various embodiments, the first electronic device 101*a* may request authentication from the profile information transfer server 520 in operation 1212. For example, the first electronic device 101*a* may request the EAP-AKA authentication scheme-based authentication from the profile information transfer server 520. The first electronic device 101*a* may transmit an authentication request including the IMSI, IMEI, or a combination thereof, of the first electronic device 101*a* to the profile information transfer server 520.

According to various embodiments, the profile information transfer server 520 may transmit a challenge to the first electronic device 101*a* in response to the authentication request in operation 1214. For example, the challenge may be an arbitrary number for authenticating the eSIM 201 of the first electronic device 101*a*. The first electronic device 101*a* may obtain the payload for the challenge based on information stored in the eSIM 201. According to various embodiments, in operation 1216, the first electronic device 101*a* may calculate and obtain the payload for the challenge based on the authentication key value of the eSIM 201. In operation 1218, the first electronic device 101*a* may transmit the payload obtained based on the eSIM 201 to the profile information transfer server 520. According to various embodiments, the profile information transfer server 520 may receive the payload from the first electronic device 101*a* and may perform authentication through the authentication server 540. For example, the authentication server 540 may determine whether authentication succeeds by comparing the payload with a value resultant from converting the challenge based on a key predesignated for the eSIM 201 of the first electronic device 101*a*. If the value resultant from converting the challenge based on the key predesignated for the eSIM 201 is identical to the payload, the authentication server 540 may determine that authentication succeeds. According to various embodiments, if it is determined that authentication succeeds as a result of authentication through the authentication server 540, the profile information transfer server 520 may transmit an authentication token, as a resultant value of payload, to the first electronic device 101*a* in operation 1220.

According to various embodiments, the first electronic device 101*a* may perform a subscription transfer procedure based on the authentication result. For example, in operation 1222, the first electronic device 101*a* may identify an authority for access to the profile information transfer server 520 through the profile information transfer server 520. For example, the first electronic device 101*a* may transmit the authentication token to the profile information transfer server 520 to identify the authority for access to the profile information transfer server 520 (or authority to use the communication service provided from the profile information transfer server 520 after accessing the profile information transfer server 520). According to various embodiments, the first electronic device 101*a* may transmit information about the first electronic device 101*a* (e.g., the IMEI of the first electronic device 101*a*) to the profile information transfer server 520. As another example, the first electronic device 101*a* may further transmit at least one of the protocol version or the vendor, model name, or software version of the first electronic device 101*a*, as well as the IMEI of the first electronic device 101*a*, to the profile information transfer server 520. According to various embodiments, the profile information transfer server 520 may identify whether the first electronic device 101*a* has the authority for access to the profile information transfer server 520 based on the information transmitted from the first electronic device 101*a*. For example, if the first electronic device 101*a* is identified to have the authority to access the profile information transfer server 520, the profile information transfer server 520 may transmit information indicating that the first electronic device 101*a* has the authority to access the profile information transfer server 520 to the first electronic device 101*a*. In contrast, if the first electronic device 101*a* is identified not to have the authority to access the profile information transfer server 520, the profile information transfer server 520 may transmit information indicating that it has no access authority to the first electronic device 101*a* or may transmit a URL to allow the first electronic device 101*a* to display a webpage of the profile information transfer server 520 or a webpage of the web server 510.

According to various embodiments, in operation 1224, the first electronic device 101*a* may request subscription transfer from the profile information transfer server 520 after the authority identification is complete in operation 1222. For example, in response to reception of the information indicating that the first electronic device 101*a* has no authority to access the profile information transfer server 520 from the profile information transfer server 520, the first electronic device 101*a* may transmit information for requesting subscription transfer to the profile information transfer server 520.

According to various embodiments, in operation 1226, the profile information transfer server 520 may request information for identifying subscription transfer and information about the new electronic device (e.g., the second electronic device 101*b*) to which subscription is to be transferred, from the first electronic device 101*a*.

According to various embodiments, the first electronic device 101*a* may transmit information indicating identification of subscription transfer and information about the new electronic device to the profile information transfer server 520 according to a request of the profile information transfer server 520. For example, the information about the new electronic device may include at least one of the EID or IMEI of the second electronic device 101*b*, but is not limited thereto.

According to various embodiments, if the profile information transfer server 520 receives the information about the new electronic device and the information indicating identification of subscription transfer from the first electronic device 101*a*, the profile information transfer server 520 may request the profile providing server 530 to generate (or prepare) a second profile in operation 1230. According to various embodiments, the profile providing server 530 may generate a second profile in response to reception of the request for generating the second profile from the profile information transfer server 520.

According to various embodiments, in operation 1232, the profile information transfer server 520 may transmit second profile download information to the first electronic device 101*a*. The second profile download information transmitted from the profile information transfer server 520 to the first electronic device 101*a* may include the address of the profile providing server 530.

According to various embodiments, in operation 1234, the first electronic device 101*a* may transmit the second profile download information (e.g., address information about the profile providing server 530) received from the profile information transfer server 520 to the second electronic device 101*b*. According to various embodiments, as in the above-described embodiments of FIGS. 6A and 6B, the first electronic device 101*a* may receive information about the second electronic device 101*b* (e.g., identification information about the second electronic device 101*b*) from the second electronic device 101*b* before operation 1234 and encrypt the second profile download information using at least part of the received identification information about the second electronic device 101*b* and transmit it to the second electronic device 101*b*. The second electronic device 101*b* may receive the encrypted second profile download information from the first electronic device 101*a* and decrypt the encrypted second profile download information using the information about the second electronic device 101*b* (e.g., at least part of the identification information about the second electronic device 101*b*). It is possible to prevent theft and use of the second profile download information by a device other than the second electronic device 101*b* by encrypting and transmitting the second profile download information.

According to various embodiments, the second electronic device 101*b* may download the second profile from the profile providing server 530 based on the second profile download information received from the first electronic device 101*a* in operation 1236. The second electronic device 101*b* may store or install the second profile received from the profile providing server 530 in the eSIM 201. For example, the second profile may be packaged in the form of software (e.g., packaged in the form of PPP or BPP) and transmitted to the second electronic device 101*b*. The second electronic device 101*b* may store or install the second profile received from the profile providing server 530 in the eSIM 201. For example, the second electronic device 101*b* may download the second profile, packaged in the form of PPP or BPP, from the profile providing server 530 and install it on the eUICC (e.g., the eUICC 401 of FIG. 4). According to an embodiment, the profile package interpreter 454 described above in connection with FIG. 4 may unpackage the PPP or BPP including the second profile received from the profile providing server 530 and then install it in the eUICC 401.

According to various embodiments, the second electronic device 101*b* may activate the second profile of the eSIM 201. In operation 1238, the second electronic device 101*b* may use the network (e.g., a cellular network) provided by the communication carrier related to the profile information transfer server 520 using the activated second profile.

According to various embodiments, the profile providing server 530 may receive information about the second electronic device 101*b* (e.g., identification information about the second electronic device 101*b*) from the profile information transfer server 520 in the second profile generation request operation of the above-described operation 1230. Thereafter, upon receiving a request for downloading the second profile from the second electronic device 101*b* in operation 1236, the profile providing server 530 may verify the validity for the second electronic device 101*b* using at least part of the identification information about the second electronic device 101*b* received from the first electronic device 101*a* and the profile information transfer server 520.

Figure 13:
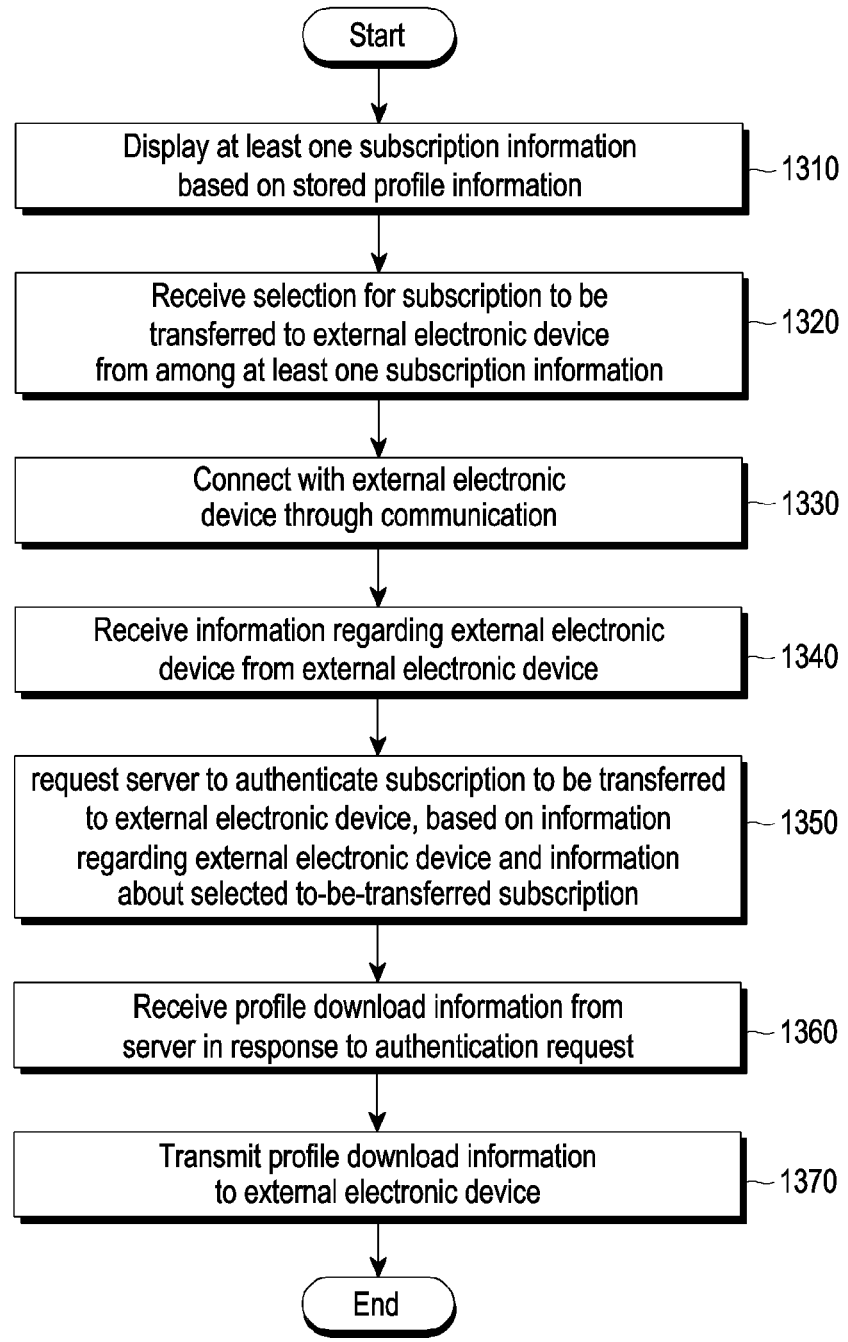
FIG. 13 is a flowchart illustrating a subscription transfer method by an electronic device according to an embodiment of the disclosure.

FIG. 13 is a flowchart illustrating a method for transferring subscription in an electronic device according to an embodiment of the disclosure.

Referring to FIG. 13, according to various embodiments, an electronic device 101 (e.g., the first electronic device 101*a*) may display at least one subscription information based on stored profile information in operation 1310.

According to various embodiments, in operation 1320, the electronic device may receive a selection for the subscription to be transferred to an external electronic device (e.g., the second electronic device 101*b*) from among at least one subscription information displayed.

According to various embodiments, the electronic device may be connected to an external electronic device through communication in operation 1330. For example, the electronic device may connect to the external electronic device through short-range wireless communication.

According to various embodiments, the electronic device may receive information regarding the external electronic device from the external electronic device in operation 1340. For example, the information about the external electronic device may include at least one of the EID or IMEI but is not limited thereto.

According to various embodiments, in operation 1350, the electronic device may request a server to authenticate the subscription to be transferred to the external electronic device, based on the information regarding the external electronic device and the information about the selected subscription to be transferred. For example, the authentication request may include an authentication request by an EAP-AKA authentication scheme.

According to various embodiments, the electronic device may receive profile download information (e.g., download information about the second profile) from the server in response to the authentication request in operation 1360.

According to various embodiments, in operation 1370, the electronic device may transmit the profile download information to the external electronic device. The external electronic device may download the second profile based on the profile download information received from the electronic device and install it on the eSIM.

Figure 14A:
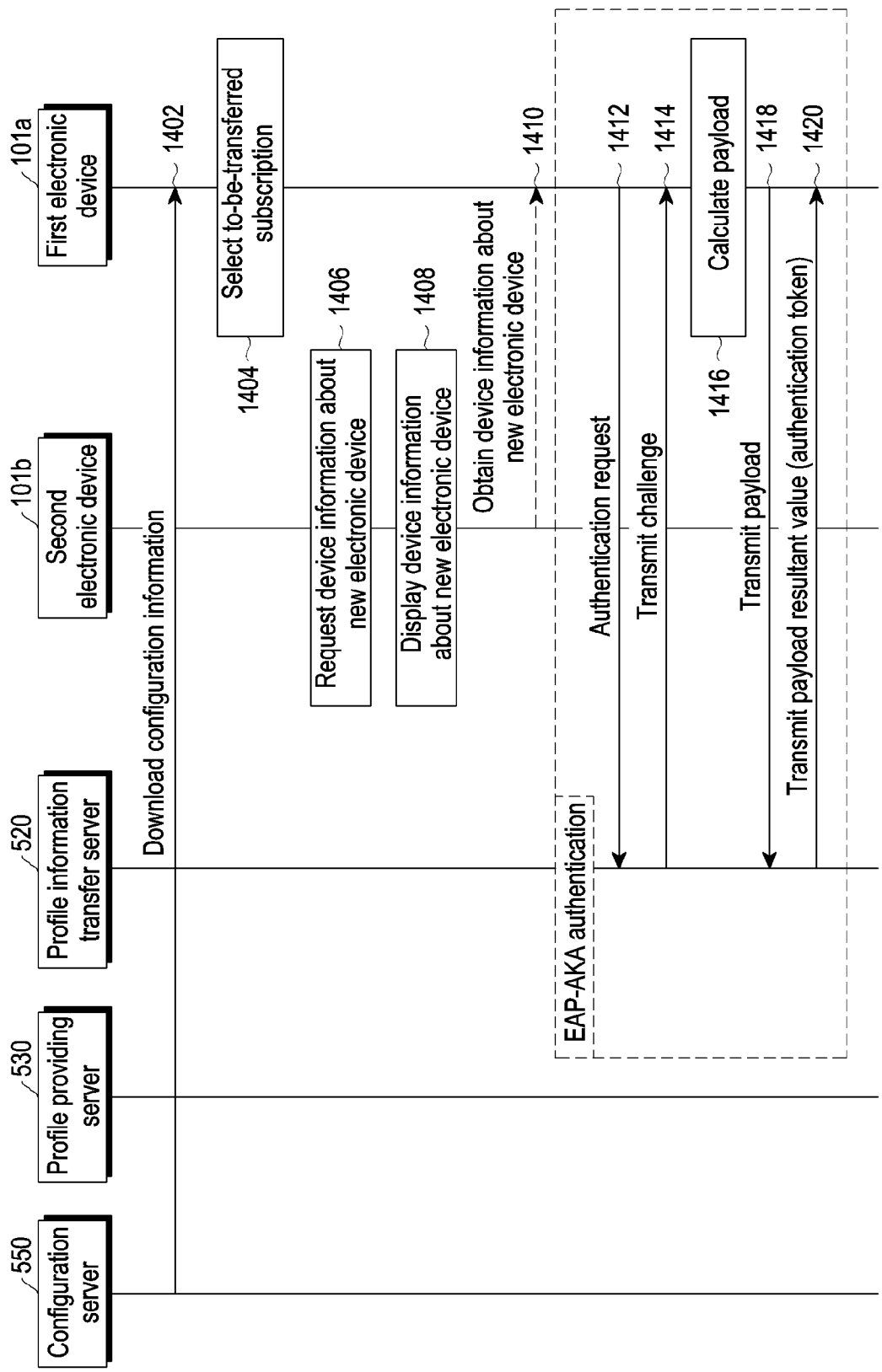
FIGS. 14A and 14B are views illustrating signal flows between devices representing a subscription transfer method according to various embodiments of the disclosure.
Figure 14B:
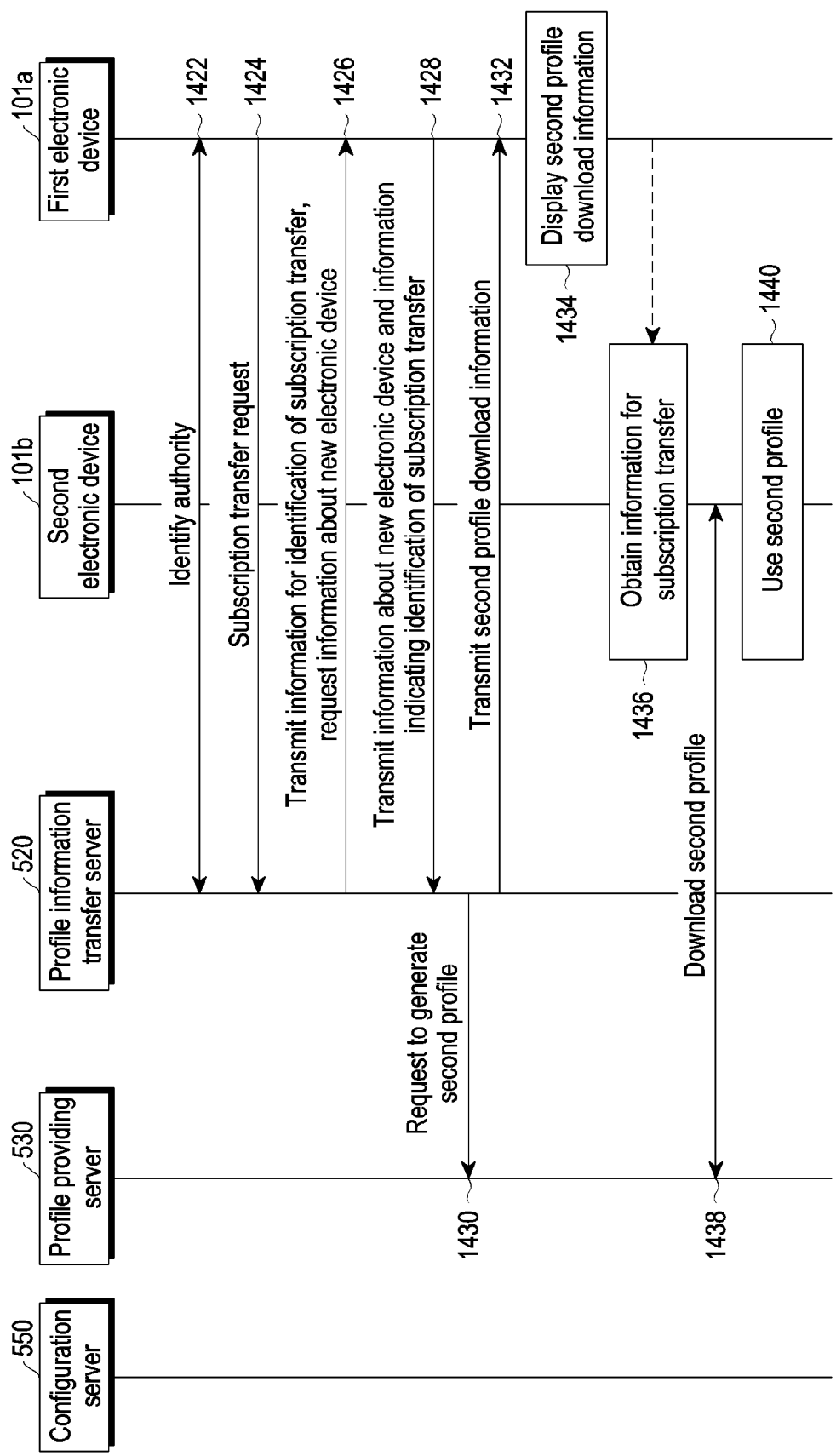

FIGS. 14A and 14B are views illustrating signal flows between devices representing a subscription transfer method according to various embodiments of the disclosure. According to various embodiments, the first electronic device 101*a* (e.g., the processor 120 of FIG. 1A) may download configuration information from the configuration server 550 in operation 1402. According to various embodiments, the configuration information downloaded from the configuration server 550 may include communication carrier information. The communication carrier information may include at least one of addresses of servers (e.g., the web server 510, profile information transfer server 520, and profile providing server 530), supportable on device activation (ODA) functions, supportable authentication schemes (e.g., short message service (SMS)-one time password (OTP) authentication scheme, extensible authentication protocol authentication and key agreement (EAP-AKA) authentication scheme), and mobile country code (MCC) and mobile network code (MNC) of communication carrier.

According to various embodiments, the first electronic device 101*a* may select the subscription to be transferred to the second electronic device 101*b* based on the profile information stored in the eSIM 201 in operation 1404. For example, as shown in FIG. 10A, if the first electronic device 101*a* executes a SIM card manager app, a SIM card manager screen 1010 may be displayed. FIGS. 10A, 10B, and 10C are views illustrating a user interface displayed on a screen of the first electronic device 101*a* according to various embodiments. Information 1011 about the physical SIM installed in the first electronic device 101*a* and information 1012 about the eSIM may be displayed on the SIM card manager screen 1010. If the information 1012 about the eSIM is selected in FIG. 10A, a configuration screen 1020 for the eSIM may be displayed as shown in FIG. 10B. The configuration screen 1020 for the eSIM may include a menu (Transfer to New Device) 1021 for transferring the subscription corresponding to the corresponding profile to a new electronic device (e.g., the second electronic device 101*b*).

According to various embodiments, if the user selects the menu 1021 for transferring the subscription corresponding to the corresponding profile to the new electronic device (e.g., the second electronic device 101*b*), a subscription transfer procedure corresponding to the corresponding profile may be performed as described below.

According to various embodiments, the user may request device information about the new electronic device through the second electronic device 101*b*, and the second electronic device 101*b* may request the device information about the new electronic device from the eSIM according to the user's request in operation 1406 and may display the device information about the new electronic device on the screen in operation 1408. For example, the device information about the new electronic device may also be displayed, in the form of QR code, on the screen of the second electronic device 101*b* as shown in FIG. 10C.

According to various embodiments, as shown in FIG. 10C, the first electronic device 101*a* may obtain device information about the new electronic device (e.g., the second electronic device 101*b*) by scanning the QR code displayed on the second electronic device 101*b* in operation 1410. For example, the device information about the second electronic device 101*b* may include at least one of an EID or an IMEI, but is not limited thereto.

According to various embodiments, the first electronic device 101*a* may perform authentication for subscription transfer with the authentication server 540 through the profile information transfer server 520, based on the received device information about the second electronic device 101*b*. According to various embodiments, the authentication method for the subscription transfer may include an extensible authentication protocol authentication and key agreement (EAP-AKA) authentication scheme. The EAP-AKA authentication scheme has relatively strong security compared to other types of authentication schemes (e.g., SMS-OTP) and does not require entry of additional information by the user, thereby providing intuitive and simple subscription transfer.

In FIG. 14A, operations 1412 to 1420 may operate according to the EAP-AKA authentication scheme. The EAP-AKA authentication scheme may include at least part of the EAP-AKA authentication scheme disclosed in GSMA standard document TS. 43.

According to various embodiments, the first electronic device 101*a* may request authentication from the profile information transfer server 520 in operation 1412. For example, the first electronic device 101*a* may request the EAP-AKA authentication scheme-based authentication from the profile information transfer server 520. The first electronic device 101*a* may transmit an authentication request including the IMSI, IMEI, or a combination thereof, of the first electronic device 101*a* to the profile information transfer server 520.

According to various embodiments, the profile information transfer server 520 may transmit a challenge to the first electronic device 101*a* in response to the authentication request in operation 1414. For example, the challenge may be an arbitrary number for authenticating the eSIM 201 of the first electronic device 101*a*. The first electronic device 101*a* may obtain the payload for the challenge based on information stored in the eSIM 201. According to various embodiments, in operation 1416, the first electronic device 101*a* may calculate and obtain the payload for the challenge based on the authentication key value of the eSIM 201. In operation 1418, the first electronic device 101*a* may transmit the payload obtained based on the eSIM 201 to the profile information transfer server 520. According to various embodiments, the profile information transfer server 520 may receive the payload from the first electronic device 101*a* and may perform authentication through the authentication server 540. For example, the authentication server 540 may determine whether authentication succeeds by comparing the payload with a value resultant from converting the challenge based on a key predesignated for the eSIM 201 of the first electronic device 101*a*. If the value resultant from converting the challenge based on the key predesignated for the eSIM 201 is identical to the payload, the authentication server 540 may determine that authentication succeeds. According to various embodiments, if it is determined that authentication succeeds as a result of authentication through the authentication server 540, the profile information transfer server 520 may transmit an authentication token, as a resultant value of payload, to the first electronic device 101*a* in operation 1420.

According to various embodiments, the first electronic device 101a may perform a subscription transfer procedure based on the authentication result. For example, in operation 1422, the first electronic device 101a may identify an authority for access to the profile information transfer server 520 through the profile information transfer server 520. For example, the first electronic device 101a may transmit the authentication token to the profile information transfer server 520 to identify the authority for access to the profile information transfer server 520 (or authority to use the communication service provided from the profile information transfer server 520 after accessing the profile information transfer server 520). According to various embodiments, the first electronic device 101a may transmit information about the first electronic device 101a (e.g., the IMEI of the first electronic device 101a) to the profile information transfer server 520. As another example, the first electronic device 101a may further transmit at least one of the protocol version or the vendor, model name, or software version of the first electronic device 101a, as well as the IMEI of the first electronic device 101a, to the profile information transfer server 520. According to various embodiments, the profile information transfer server 520 may identify whether the first electronic device 101a has the authority for access to the profile information transfer server 520 based on the information transmitted from the first electronic device 101a. For example, if the first electronic device 101a is identified to have the authority to access the profile information transfer server 520, the profile information transfer server 520 may transmit information indicating that the first electronic device 101a has the authority to access the profile information transfer server 520 to the first electronic device 101a. In contrast, if the first electronic device 101a is identified not to have the authority to access the profile information transfer server 520, the profile information transfer server 520 may transmit information indicating that it has no access authority to the first electronic device 101a or may transmit a URL to allow the first electronic device 101a to display a webpage of the profile information transfer server 520 or a webpage of the web server 510.

According to various embodiments, in operation 1424, the first electronic device 101a may request subscription transfer from the profile information transfer server 520 after the authority identification is complete in operation 1422. For example, in response to reception of the information indicating that the first electronic device 101a has no authority to access the profile information transfer server 520 from the profile information transfer server 520, the first electronic device 101a may transmit information for requesting subscription transfer to the profile information transfer server 520.

According to various embodiments, in operation 1426, the profile information transfer server 520 may request information for identifying subscription transfer and information about the new electronic device (e.g., the second electronic device 101b) to which subscription is to be transferred, from the first electronic device 101a.

According to various embodiments, the first electronic device 101a may transmit information indicating identification of subscription transfer and information about the new electronic device to the profile information transfer server 520 according to a request of the profile information transfer server 520 in operation 1428. For example, the information about the new electronic device may include at least one of the EID or IMEI of the second electronic device 101b, but is not limited thereto.

According to various embodiments, if the profile information transfer server 520 receives the information about the new electronic device and the information indicating identification of subscription transfer from the first electronic device 101a, the profile information transfer server 520 may request the profile providing server 530 to generate (or prepare) a second profile in operation 1430.

According to various embodiments, the profile providing server 530 may generate a second profile in response to reception of the request for generating the second profile from the profile information transfer server 520.

According to various embodiments, in operation 1432, the profile information transfer server 520 may transmit second profile download information to the first electronic device 101a. The second profile download information transmitted from the profile information transfer server 520 to the first electronic device 101a may include the address of the profile providing server 530.

According to various embodiments, in operation 1434, the first electronic device 101a may display the second profile download information (e.g., address information about the profile providing server 530) received from the profile information transfer server 520 on the screen. For example, the second profile download information may be displayed, in the form of QR code, on the screen as shown in FIG. 10C. According to various embodiments, the second electronic device 101b may obtain the second profile download information by scanning the QR code displayed on the first electronic device 101a in operation 1436.

According to various embodiments, the second electronic device 101b may download the second profile from the profile providing server 530 based on the second profile download information received from the first electronic device 101a in operation 1438. The second electronic device 101b may store or install the second profile received from the profile providing server 530 in the eSIM 201. For example, the second electronic device 101b may download the second profile, packaged in the form of PPP or BPP, from the profile providing server 530 and install it on the eUICC (e.g., the eUICC 401 of FIG. 4). According to an embodiment, the profile package interpreter 454 described above in connection with FIG. 4 may unpackage the PPP or BPP including the second profile received from the profile providing server 530 and then install it in the eUICC 401.

According to various embodiments, the second electronic device 101b may activate the second profile of the eSIM 201. In operation 1440, the second electronic device 101b may use the network (e.g., a cellular network) provided by the communication carrier related to the profile information transfer server 520 using the activated second profile.

FIG. 15 is a flowchart illustrating a subscription transfer method by an electronic device according to an embodiment of the disclosure.

Referring to FIG. 15, according to various embodiments, an electronic device 101 (e.g., the first electronic device 101a) may display at least one subscription information based on stored profile information in operation 1510.

According to various embodiments, in operation 1520, the electronic device may receive a selection for the subscription to be transferred to an external electronic device (e.g., the second electronic device 101b) from among at least one subscription information displayed.

According to various embodiments, the electronic device may obtain information regarding the external electronic device from the external electronic device in operation 1530. For example, the electronic device may obtain the information regarding the external electronic device by scanning the QR code displayed on the external electronic device. The information about the external electronic device may include at least one of the EID or IMEI but is not limited thereto.

According to various embodiments, in operation 1540, the electronic device may request a server to authenticate the subscription to be transferred to the external electronic device, based on the information regarding the external electronic device and the information about the selected subscription to be transferred. For example, the authentication request may include an authentication request by an EAP-AKA authentication scheme.

According to various embodiments, the electronic device may receive profile download information (e.g., download information about the second profile) from the server in response to the authentication request in operation 1550.

According to various embodiments, the electronic device may display profile download information on the screen in operation 1560. For example, the electronic device may generate a QR code corresponding to the profile download information and display it on the screen. The external electronic device may obtain the profile download information by scanning the QR code displayed on the screen of the electronic device. The external electronic device may download the second profile based on the profile download information obtained from the electronic device and install it on the eSIM.

According to any one of various embodiments, an electronic device may comprise at least one embedded universal integrated circuit card (eUICC) each storing at least one subscriber identity information and at least one processor electrically connected to the eUICC. The at least one processor may control to connect with an external electronic device through communication, receive a subscription information request for subscription transfer from the external electronic device, identify at least one transferable subscription information from profile information stored in the eUICC, in response to the reception of the subscription information request, transmit the identified, at least one transferable subscription information to the external electronic device, receive to-be-transferred subscription information selected from among the at least one transferable subscription information from the external electronic device, request a server to authenticate the to-be-transferred subscription selected by the external electronic device, receive information corresponding to a result of the authentication from the server, in response to the request for the authentication, and transmit information for subscription transfer including the information corresponding to the authentication result to the external electronic device.

According to various embodiments, the at least one processor may control to receive configuration information from a configuration server.

According to various embodiments, the configuration information may include whether a corresponding communication carrier's subscription transfer function is supported.

According to various embodiments, the electronic device may be connected with the external electronic device through short-range wireless communication. The at least one processor may control to transmit the identified, at least one transferable subscription information to the external electronic device through the short-range wireless communication.

According to various embodiments, the authentication request may include an authentication request by an extensible authentication protocol authentication and key agreement (EAP-AKA) scheme.

According to various embodiments, the information corresponding to the authentication result may include an authentication token.

According to various embodiments, the information for subscription transfer may include information regarding the electronic device.

According to various embodiments, the information regarding the electronic device may include at least one of a mobile country code (MCC) and a mobile network code (MNC), an international mobile subscriber identity (IMSI), an eUICC identity (EID), an international mobile equipment identity (IMEI), an integrated circuit card identity (ICCID), and a product model name identified from the profile information.

According to any one of various embodiments, a method for performing subscription transfer in an electronic device including at least one embedded universal integrated circuit card (eUICC) each storing at least one subscriber identity information and at least one processor electrically connected to the eUICC may comprise connecting with an external electronic device through communication, receiving a subscription information request for subscription transfer from the external electronic device, identifying at least one transferable subscription information from profile information stored in the eUICC, in response to the reception of the subscription information request, transmitting the identified, at least one transferable subscription information to the external electronic device, receiving to-be-transferred subscription information selected from among the at least one transferable subscription information from the external electronic device, requesting a server to authenticate the to-be-transferred subscription selected by the external electronic device, receiving information corresponding to a result of the authentication from the server, in response to the request for the authentication, and transmitting information for subscription transfer including the information corresponding to the authentication result to the external electronic device.

According to various embodiments, the method may further comprise receiving configuration information from a configuration server.

According to various embodiments, the configuration information may include whether a corresponding communication carrier's subscription transfer function is supported.

According to various embodiments, the method may further comprise transmitting the identified, at least one transferable subscription information to the external electronic device through the short-range wireless communication.

According to various embodiments, the authentication request may include an authentication request by an extensible authentication protocol authentication and key agreement (EAP-AKA) scheme.

According to various embodiments, the information corresponding to the authentication result may include an authentication token.

According to various embodiments, the information for subscription transfer may include information regarding the electronic device.

According to various embodiments, the information regarding the electronic device may include at least one of a mobile country code (MCC) and a mobile network code (MNC), an international mobile subscriber identity (IMSI), an eUICC identity (EID), an international mobile equipment identity (IMEI), an integrated circuit card identity (ICCID), and a product model name identified from the profile information.

According to any one of various embodiments, an electronic device may comprise a display, at least one embedded universal integrated circuit card (eUICC) each storing at least one subscriber identity information, and at least one processor electrically connected to the eUICC. The at least one processor may control to display at least one subscription information on the display based on profile information stored in the eUICC, receive a selection for a subscription to be transferred to an external electronic device among the at least one subscription information, request a server to authenticate the selected subscription to be transferred to the external electronic device, receive information corresponding to a result of the authentication from the server, in response to the request for the authentication, and display information for subscription transfer on the display based on the information corresponding to the authentication result.

According to various embodiments, the authentication request may include an authentication request by an extensible authentication protocol authentication and key agreement (EAP-AKA) scheme.

According to various embodiments, the information corresponding to the authentication result may include an authentication token.

According to various embodiments, the information for subscription transfer may be displayed in a form of a quick response (QR) code. The information for subscription transfer may include at least one of a mobile country code (MCC) and a mobile network code (MNC), an international mobile subscriber identity (IMSI), an eUICC identity (EID), an international mobile equipment identity (IMEI), an integrated circuit card identity (ICCID), and a product model name identified from the profile information.

The electronic device according to an embodiment of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising: at least one embedded universal integrated circuit card (eUICC); at least one processor coupled with the at least one eUICC; and
memory storing one or more computer programs including computer-executable instructions that, when executed by the at least one processor, cause the electronic device to:
connect with an external electronic device through communication,
receive a subscription information request for subscription
transfer from the external electronic device,
identify at least one transferable subscription information from profile information stored in the at least one eUICC, in response to receiving the subscription information request,
transmit the identified at least one transferable subscription information to the external electronic device,
receive first subscription information selected from among the at least one transferable subscription information from the external electronic device,
request an extensible authentication protocol-authentication and key agreement (EAP-AKA) authentication associated with a first profile corresponding to the first subscription information to a first server,
receive information corresponding to a result of the EAP-AKA authentication from the first server, in response to the request for the EAP-AKA authentication, and
transmit information for subscription transfer including the information corresponding to the EAP-AKA authentication result to the external electronic device,
wherein the information corresponding to the EAP-AKA authentication result comprises an EAP-AKA token which is to be used by the external electronic device to download a second profile corresponding to the first subscription information from a second server,
wherein the first server is a profile information transfer server,
wherein the second server is profile providing server, and
wherein the first server and the second server are separate servers.

2. The electronic device of claim 1, wherein the one or more computer programs further comprise computer-executable instructions to receive configuration information from a configuration server.

3. The electronic device of claim 2, wherein the configuration information includes information regarding whether a corresponding communication carrier's subscription transfer function is supported.

4. The electronic device of claim 1,
wherein the communication through which the electronic device is connected with the external electronic device comprises short-range wireless communication, and
wherein the one or more computer programs further comprise computer-executable instructions to transmit the identified at least one transferable subscription information to the external electronic device through the short-range wireless communication.

5. The electronic device of claim 1, wherein the information for subscription transfer includes information regarding the electronic device.

6. The electronic device of claim 5, wherein the information regarding the electronic device includes at least one of:
a mobile country code (MCC) and a mobile network code (MNC),
an international mobile subscriber identity (IMSI),
an eUICC identity (EID),
an international mobile equipment identity (IMEI),
an integrated circuit card identity (ICCID), or
a product model name identified from the profile information.

7. The electronic device of claim 1, wherein the information corresponding to the EAP-AKA authentication result includes address information of the second server.

8. The electronic device of claim 1, wherein the second profile differs from the first profile based on a subscription condition that is changed during subscription transfer.

9. A method for performing subscription transfer at an electronic device including at least one embedded universal integrated circuit card (eUICC) and at least one processor coupled with the at least one eUICC, the method comprising:
connecting with an external electronic device through communication;
receiving a subscription information request for subscription transfer from the external electronic device;
identifying at least one transferable subscription information from profile information stored in the at least one eUICC, in response to receiving the subscription information request;
transmitting the identified at least one transferable subscription information to the external electronic device;
receiving first subscription information selected from among the at least one transferable subscription information from the external electronic device;
requesting an extensible authentication protocol-authentication and key agreement (EAP-AKA) authentication associated with a first profile corresponding to the first subscription information to a first server;
receiving information corresponding to a result of the EAP-AKA authentication from the first server, in response to the request for the EAP-AKA authentication; and
transmitting information for subscription transfer including the information corresponding to the EAP-AKA authentication result to the external electronic device,
wherein the information corresponding to the EAP-AKA authentication result comprises an EAP-AKA token which is to be used by the external electronic device to download a second profile corresponding to the first subscription information from a second server,
wherein the first server is a profile information transfer server,
wherein the second server is profile providing server, and
wherein the first server and the second server are separate servers.

10. The method of claim 9, further comprising receiving configuration information from a configuration server.

11. The method of claim 10, wherein the configuration information includes information regarding whether a corresponding communication carrier's subscription transfer function is supported.

12. The method of claim 9, further comprising transmitting the identified at least one transferable subscription information to the external electronic device through a short-range wireless communication.

13. The method of claim 9, wherein the information for subscription transfer includes information regarding the electronic device.

14. The method of claim 13, wherein the information regarding the electronic device includes at least one of a mobile country code (MCC) and a mobile network code (MNC), an international mobile subscriber identity (IMSI), an eUICC identity (EID), an international mobile equipment identity (IMEI), an integrated circuit card identity (ICCID), or a product model name identified from the profile information.

* * * * *